US008346534B2

(12) United States Patent
Csomai et al.

(10) Patent No.: US 8,346,534 B2
(45) Date of Patent: Jan. 1, 2013

(54) METHOD, SYSTEM AND APPARATUS FOR AUTOMATIC KEYWORD EXTRACTION

(75) Inventors: Andras Csomai, Satu-Mare (RO); Rada Mihalcea, Carroltton, TX (US)

(73) Assignee: University of North Texas System, Denton, TX (US)

( * ) Notice: Subject to any disclaimer, the term of this patent is extended or adjusted under 35 U.S.C. 154(b) by 442 days.

(21) Appl. No.: 12/614,387

(22) Filed: Nov. 6, 2009

(65) Prior Publication Data
US 2010/0145678 A1 Jun. 10, 2010

Related U.S. Application Data

(60) Provisional application No. 61/112,182, filed on Nov. 6, 2008.

(51) Int. Cl.
*G06F 17/27* (2006.01)
*G06F 17/21* (2006.01)

(52) U.S. Cl. ............... 704/1; 704/10; 707/711; 707/741

(58) Field of Classification Search .................. 704/1, 9, 704/10; 707/711, 741
See application file for complete search history.

(56) References Cited

U.S. PATENT DOCUMENTS

| | | | |
|---|---|---|---|
| 5,960,383 A * | 9/1999 | Fleischer | 704/9 |
| 6,470,307 B1 | 10/2002 | Turney | |
| 7,266,545 B2 * | 9/2007 | Bergman et al. | 707/706 |
| 7,581,227 B1 * | 8/2009 | Lawrence et al. | 719/318 |
| 7,707,204 B2 * | 4/2010 | Li et al. | 707/711 |
| 7,809,548 B2 * | 10/2010 | Mihalcea et al. | 704/1 |
| 8,090,723 B2 * | 1/2012 | Cao et al. | 707/741 |
| 2004/0181389 A1 * | 9/2004 | Bourigault et al. | 704/1 |
| 2005/0278325 A1 * | 12/2005 | Mihalcea et al. | 707/6 |
| 2007/0233656 A1 * | 10/2007 | Bunescu et al. | 707/3 |
| 2008/0126311 A1 * | 5/2008 | Rowley | 707/3 |
| 2010/0114863 A1 * | 5/2010 | Steelberg et al. | 707/709 |
| 2011/0072023 A1 * | 3/2011 | Lu | 707/741 |
| 2012/0197864 A1 * | 8/2012 | Bourdoncle et al. | 707/711 |

OTHER PUBLICATIONS

Csomai et al., "Linking Documents to Encyclopedic Knowledge", IEEE Intelligent Systems, Sep.-Oct. 2008, vol. 23, Issue 5, pp. 34 to 41.*
Adafe S. F., et al., "Finding similar sentences across multiple languages in Wikipedia," In Proceedings of the EACL Workshop on New Text, Trento, Italy, 2006.
Berners-Lee, T., et al., "The Semantic Web," Scientific American, 1(501), May 2001.
Brin, S., et al., "The anatomy of a large-scale hypertextual Web search engine," Computer Networks and ISDN Systems, 1998, 30(1-7).

(Continued)

*Primary Examiner* — Martin Lerner
(74) *Attorney, Agent, or Firm* — Daniel J. Chalker; Edwin S. Flores; Chalker Flores, LLP

(57) ABSTRACT

The present invention provides a method and a system for automatic keyword extraction based on supervised or unsupervised machine learning techniques. Novel linguistically-motivated machine learning features are introduced, including discourse comprehension features based on construction integration theory, numeric features making use of syntactic part-of-speech patterns, and probabilistic features based on analysis of online encyclopedia annotations. The improved keyword extraction methods are combined with word sense disambiguation into a system for automatically generating annotations to enrich text with links to encyclopedic knowledge.

124 Claims, 10 Drawing Sheets

OTHER PUBLICATIONS

Bunescu, R., et al., "Using encyclopedic knowledge for named entity disambiguation," In Proceedings of the European Conference of the Association for Computational Linguistics, Trento, Italy, 2006.

Csomai, A., et al., "Creating a testbed for the evaluation of automatically generated back-of-the-book indexes," In Proceedings of the International Conference on Computational Linguistics and Intelligent Text Processing, pp. 19-25, Mexico City, 2006.

Csomai, A., et al., "Investigations in unsupervised back-of-the-book indexing," In Proceedings of the Florida Artificial Intelligence Research Society, Key West, 2007.

Drenner, S., et al., "Insert movie reference here: a system to bridge conversation and item-oriented web sites," In Proceedings of the SIGCHI conference on Human Factors in computing systems, pp. 951-954, New York, NY, USA, 2006. ACM Press.

Faaborg, A., et al., "A goal-oriented Web browser," In Proceedings of the SIGCHI conference onHuman Factors in computing systems, pp. 751-760, Montreal, Canada, 2006.

Feng, D., et al., 2006. Towards modeling threaded discussions through ontology-based analysis. In Proceedings of National Conference on Artificial Intelligence, 2006.

Frank, E., et al., "Domain-specific keyword extraction," In Proceedings of the 16th International Joint Conference on Artificial Intelligence, 1999.

Gabrilovich, E., et al., "Overcoming the brittleness bottleneck using wikipedia: Enhancing text categorization with encyclopedic knowledge," In Proceedings of the National Conference on Artificial Intelligence (AAAI), Boston, 2006.

Giles, J., "Internet encyclopaedias go head to head," Nature, 438(7070):900-901, 2005.

Gliozzo, A., et al., "Domain kernels for word sense disambiguation," In Proceedings of the 43th Annual Meeting of the Association for Computational Linguistics, Ann Arbor, Michigan, 2005.

Gutwin, C., et al., "Improving browsing in digital libraries with keyword indexes," Decision Support Systems, 27 (1-2):81-104, 1999.

Hulth, A., "Improved automatic keyword extraction given more linguistic knowledge," In Proceedings of the 2003 Conference on Empirical Methods in Natural Language Processing, Japan, Aug. 2003.

Kubat, M., et al., "Addressing the curse of imbalanced training sets: one-sided selection," In Proceedings of the 14th International Conference on Machine Learning, 1997.

Landauer, T. K., et al., "Introduction to latent semantic analysis," Discourse Processes, 25, 1998.

Lee, Y., et al., "An empirical evaluation of knowledge sources and learning algorithms for word sense disambiguation" In Proceedings of the 2002 Conference on Empirical Methods in Natural Language Processing (EMNLP 2002), Philadelphia, Jun. 2002.

Lesk, M., "Automatic sense disambiguation using machine readable dictionaries: How to tell a pine cone from an ice cream cone," In Proceedings of the SIGDOC Conference 1986, Toronto, Jun. 1986.

Lieberman, H. , et al., "Adaptive linking between text and photos using common sense reasoning," In Conference on Adaptive Hypermedia and Adaptive Web Systems, Malaga, Spain, 2000.

Mihalcea, R., et al., "TextRank—bringing order into texts," In Proceedings of the Conference on Empirical Methods in Natural Language Processing (EMNLP 2004), Barcelona, Spain, 2004.

Mihalcea, R.; "Large vocabulary Unsupervised word sense disambiguation with graph-based algorithms for sequence data labeling," In Proceedings of the Human Language Technology / Empirical Methods in Natural Language Processing conference, Vancouver, 2005.

Mihalcea, R., "Using Wikipedia for automatic word sense disambiguation," In Human Language Technologies 2007: The Conference of the North American Chapter of the Association for Computational Linguistics, Rochester, New York, Apr. 2007.

Mihalcea, R., et al., "Wikify! Linking Documents to Encyclopedic Knowledge," Proceedings of the sixteenth ACM Conference on Information and Knowledge Management. Lisbon, Portugal, Nov. 6-8, 2007, pp. 233-242, 2007.

Miller, G., "Wordnet: A lexical database," Communication of the ACM, 38(11):39-41, 1995.

Navigli, R., et al., "Graph connectivity measures for unsupervised word sense disambiguation," In Proceedings of the International Joint Conference on Artificial Intelligence, Hyderabad, India, 2007.

Navigili, . R et al., "Structural semantic interconnections: a knowledge-based approach to word sense disambiguation," IEEE Transactions on Pattern Analysis and Machine Intelligence (PAMI), 27, 2005.

Ng, H., et al., "Integrating multiple knowledge sources to disambiguate word sense: An examplar-based approach," In Proceedings of the 34th Annual Meeting of the Association for Computational Linguistics (ACL 1996), Santa Cruz, 1996.

Pedersen, T., "A decision tree of bigrams is an accurate predictor of word sense," In Proceedings of the North American Chapter of the Association for Computational Linguistics (NAACL 2001), pp. 79-86, Pittsburgh, Jun. 2001.

Pradhan, S., et al., "Semeval-2007 task-17: English lexical sample, srl and all words," In Proceedings of the Fourth International Workshop on Semantic Evaluations (SemEval-2007), Prague, Czech Republic, Jun. 2007.

Salton, G., et al., "Term-weighting approaches in automatic text retrieval," Information Processing & Management, 24(5):513-523, 1988.

Strube, M., et al., "Wikirelate! Computing semantic relatedeness using Wikipedia," In Proceedings of the American Association for Artificial Intelligence, Boston, MA, 2006.

Turney, P., "Learning algorithms for keyword extraction," Information Retrieval, 2(4):303-336, 2000.

Csomai, A., et al., "Linguistically Motivated Features for Enhanced Back-of-the-Book Indexing.," Proceedings of the 46th Annual Meeting of the Association for Computational Linguistics: Human Language Technologies. Columbus, Ohio, Jun. 15-20, 2008, pp. 932-640.

Mihalcea, R., et al., Proceedings of SENSEVAL-3, Association for Computational Linguistics Workshop, Barcelona, Spain, Jul. 25-26, 2004, 17 pages.

* cited by examiner

METHOD, SYSTEM AND APPARATUS FOR AUTOMATIC KEYWORD EXTRACTION

CROSS REFERENCE TO RELATED APPLICATIONS

This patent application is a non-provisional patent application of U.S. patent application 61/112,182 filed on Nov. 6, 2008 and entitled "Method, System and Apparatus for Automatic Keyword Extraction," which is hereby incorporated by reference in its entirety.

FIELD OF THE INVENTION

The present invention relates generally to the field of data processing and, more particularly, to a method, computer program, apparatus, and system for automatic keyword extraction.

BACKGROUND OF THE INVENTION

Books represent one of the oldest forms of written communication and have been used since thousands of years ago as a means to store and transmit information. Despite this fact and given that a large fraction of the electronic documents available online and elsewhere consist of short texts such as Web pages, news articles, scientific reports, and others, the focus of natural language processing techniques to date has been on the automation of methods targeting short documents. A change however can be seen: more and more books are becoming available in electronic format, in projects such as the Million Books project, the Gutenberg project, or Google Book Search. Similarly, a large number of the books published in recent years are often available—for purchase or through libraries—in electronic format. This means that the need for language processing techniques able to handle very large documents such as books is becoming increasingly important.

A back-of-the-book index typically consists of the most important keywords addressed in a book, with pointers to the relevant pages inside the book. The construction of such indexes is one of the few tasks related to publishing that still requires extensive human labor. Although there is a certain degree of computer assistance, consisting of tools that help the professional indexer to organize and edit the index, there are no methods that would allow for complete or nearly-complete automation of the task.

In addition to helping professional indexers in their task, an automatically generated back-of-the-book index can also be useful for the automatic storage and retrieval of a document; as a quick reference to the content of a book for potential readers, researchers, or students; or as a starting point for generating ontologies tailored to the content of the book.

Keywords are not only used as entries in back-of-the-book indexes, but can be used to give a concise, high-level description of a document's contents that can help to determine a document's relevance, or as a low-cost measure of similarity between documents. They are also used in a topic search, in which a keyword is entered into a search engine and all documents with this particular keyword attached are returned to a user. It can be seen that improved keyword extraction methods have a wide range of applications for short documents as well as in back-of-the-book index generation for large documents.

Unfortunately, only a small fraction of documents have keywords assigned to them, and manually attaching keywords to existing documents is a very laborious task. Therefore, automation of this process using artificial intelligence, for example, machine learning techniques, is of interest. In implementing keyword extraction, any phrase in a new document can be identified—extracted—as a keyword. Then, machine learning or another computational technique is used to determine properties that distinguish candidate words that are keywords from those that are not.

The state-of-the-art in keyword extraction is currently represented by supervised learning methods, where a system is trained to recognize keywords in a text based on lexical and syntactic features. This approach was first suggested in Turney, 1999; and U.S. Pat. No. 6,470,307, where parameterized heuristic rules are combined with a special-purpose genetic algorithm into a system for keyword extraction (GenEx) that automatically identifies keywords in a document. Training GenEx on a new collection is computationally very expensive. A different learning algorithm was used in Kea [Frank et al., 1999]. Very briefly, Kea is a supervised system that uses a Naïve Bayes learning algorithm and several features, including information theoretic features such as tf.idf and positional features reflecting the position of the words with respect to the beginning of the text. Training Kea is much quicker than for training GenEx. Finally, in recent work, [Hulth, 2003] a system for keyword extraction from abstracts has been proposed that uses supervised learning with lexical and syntactic features, which were shown to improve keyword extraction significantly over previously published results.

A related task that requires keyword extraction is that of annotating a document with links to sources of additional information. An example of a collection of such documents is found in Wikipedia, an online encyclopedia, which is provided with manually-assigned keywords in the form of annotations consisting of hyperlinks to pages within or outside Wikipedia that are embedded within the text of each article. These annotations are currently performed by human contributors of articles to Wikipedia by hand following a Wikipedia "manual of style," which gives guidelines concerning the selection of important concepts in a text, as well as the assignment of links to appropriate related articles. A system that could automatically perform the annotation task would aid contributors to Wikipedia, but there are also many other applications that could benefit from such a system.

Thus, there are many benefits to be gleaned from the capability of automatic extraction of keywords and automatic annotation of electronic text using this capability, and a large number of potential applications for these technologies. However, even state-of-the art systems for automatic keyword extraction and annotation still perform at relatively low levels using the standard information retrieval metrics: precision, recall, and F-measure; and they often fail to produce keywords or annotations approaching the quality of those that are manually constructed by human authors or professional indexers. There is, therefore, a need for improved keyword extraction methods and systems to enhance the quality of automatically-generated indexes and for use in linking other relevant information to electronic documents.

SUMMARY OF THE INVENTION

The present invention provides a method, a computer program, an apparatus, and a system for automatically generating one or more keywords from an electronic document. Examples of collections of keywords used for finding useful information include a back-of-the-book index for a book-length document, and keywords used as annotation links within electronic encyclopedias such as Wikipedia. The present invention provides a method of automatically processing electronic documents in order to extract useful collections of keywords, which achieves a goal of more closely approaching a quality of output like that generated by human authors and/or professional indexers. Both unsupervised and supervised methods of automatic keyword extraction algorithms are provided, each with advantages in speed and performance. Novel features for use by machine learning algorithms in keyword extraction are introduced that also have further applications in other areas of natural language processing using computer data processing systems. By combining keyword extraction with word sense disambiguation, a system for automatically annotating electronic documents with links to related information in an electronic encyclopedia is also described that can be used to enrich text for educational and other purposes.

More specifically, the present invention provides a method for automatically generating one or more keywords from an electronic document. Candidate entries for the keywords are identified. A feature vector is constructed for each candidate entry, wherein the feature vector includes at least one feature among one or more discourse comprehension features, one or more part-of-speech pattern features, or one or more encyclopedic annotation features. A numeric score is then assigned to each candidate entry based on the feature vector for that candidate entry. A specified number of entries are selected as the keywords. In addition, the present invention can be implemented as a computer program embodied on a computer readable medium wherein one or more code segments perform the steps described above.

The present invention also provides an apparatus for automatically generating one or more keywords from an electronic document that includes an interface to a document storage repository, a memory, and a processor communicably connected to the interface and the memory. The processor identifies candidate entries for the keywords, constructs a feature vector for each candidate entry, where the feature vector includes at least one feature from among one or more discourse comprehension features, one or more part-of-speech pattern features, and one or more encyclopedic annotation features, assigns a numeric score to each candidate entry based on the feature vector for that candidate entry, and selects a specified number of entries to be the keywords.

In addition, the present invention provides a system for automatically generating one or more keywords from an electronic document that includes a network, one or more client computers communicably connected to the network, one or more server computers communicably connected to the network, one or more document storage repositories communicably connected to the network, to one or more of the client computers, or to one or more of the server computers, and a processor within at least one of the client computers or server computers. The processor identifies candidate entries for the keywords, constructs a feature vector for each candidate entry, where the feature vector includes at least one feature from among one or more discourse comprehension features, one or more part-of-speech pattern features, and one or more encyclopedic annotation features, assigns a numeric score to each candidate entry based on the feature vector for that candidate entry, and selects a specified number of entries to be retained as the keywords.

Other features and advantages of the present invention will be apparent to those of ordinary skill in the art upon reference to the following detailed description taken in conjunction with the accompanying drawings.

BRIEF DESCRIPTION OF THE DRAWINGS

The above and further advantages of the invention may be better understood by referring to the following description in conjunction with the accompanying drawings, in which.

DETAILED DESCRIPTION OF THE INVENTION

Figure 1:
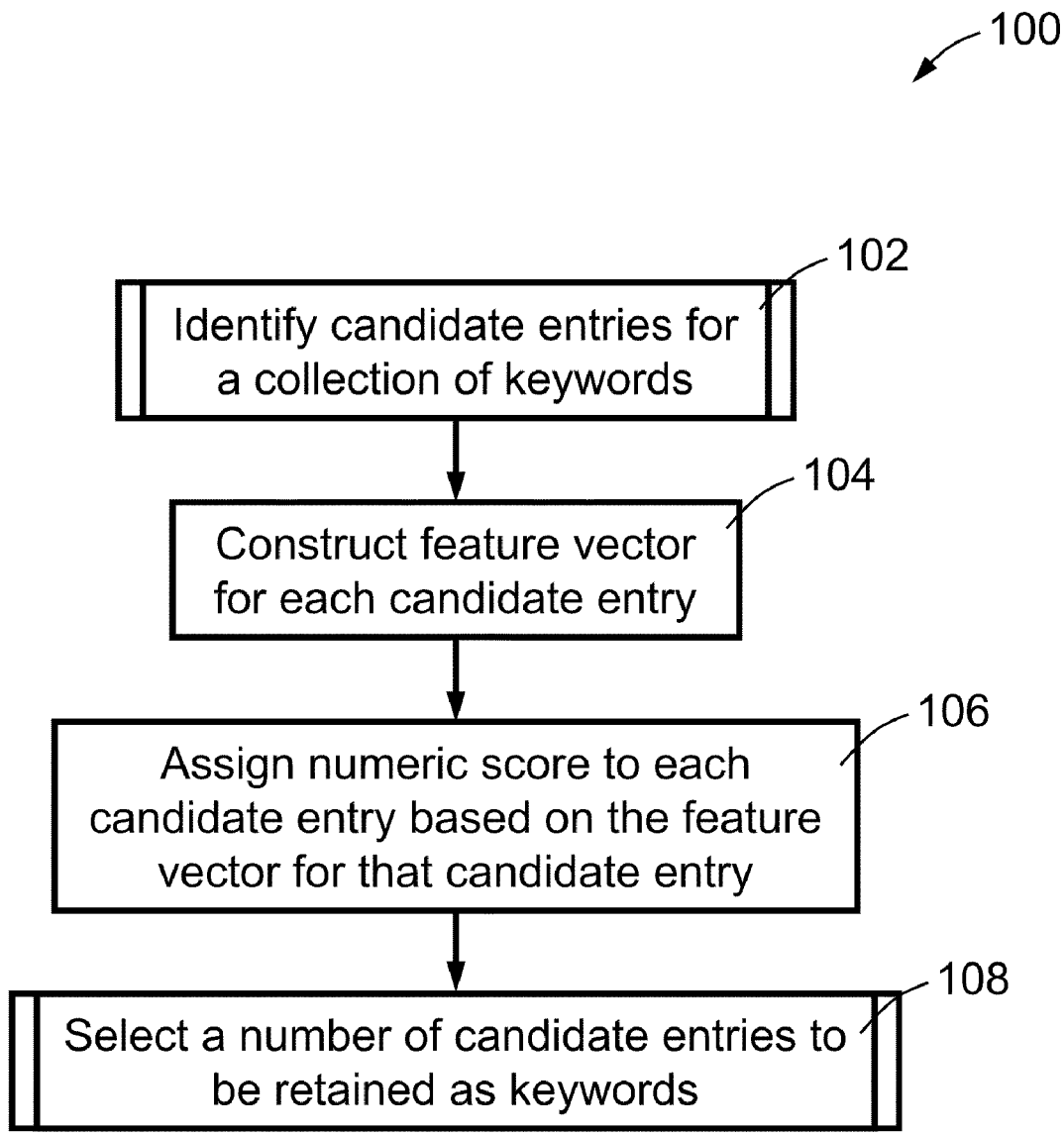
FIG. 1 depicts a flow chart of an unsupervised method for generating one or more keywords in accordance with one embodiment of the present invention.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

Keyword extraction is the identification, within a supplied document, of one or more keywords which can be used to locate information of interest within the document. An example of a list or collection of keywords that can be used for finding useful information is a back-of-the-book index for a book-length document. Such back-of-the-book indexes are generated manually by human indexing professionals. Automation of this task would save a great deal of labor and facilitate possible information lookup on documents that would otherwise never have had indexes. There are also many uses for keyword extraction on shorter documents, such as online web pages, abstracts, or articles. However, most documents are not supplied with a collection of related keywords generated either by the human author, another human, or automatically. Therefore, it would be desirable to have a means for processing any document automatically using a computer to generate the keywords. A related task that requires keyword extraction is that of annotating a document with links to sources of additional information. It is very important that keywords that are generated be useful and relevant to human readers as well as to automatic systems that might process the document or collections of documents that are so indexed. The standard for quality of collections of keywords remains indexes and keyword collections that are generated by humans. The present invention provides a method of automatically processing electronic documents containing text, in order to extract useful collections of keywords, which achieves a goal of more closely approaching a quality of output like that generated by human authors and/or professional indexers.

The present invention applies recent advances in artificial intelligence, specifically machine learning techniques, together with novel features that provide machine learning or ranking algorithms with high-quality and numeric quantitative information as to the relevance of extracted candidate keywords. The inventive methods of deriving and applying these new features to generate collections of keywords is shown to result in improved performance over state-of-the-art keyword extraction algorithms, and to enable further novel applications in annotating text with links to relevant reference information.

Two types of machine learning algorithms are referred to as supervised learning and unsupervised learning. In supervised learning, an algorithm generates a function that maps inputs to desired outputs, often formulated as a "classification" problem, in which the training data is provided with several input-output examples demonstrating a desired mapping. In unsupervised learning, an algorithm functions as an agent which models a set of inputs, but labeled examples are not available to train the algorithm in making classification decisions. Both types of algorithms use the concept of a "feature." Features are individual measurable heuristic properties of the phenomena being observed that can be used to create a numerical representation of the phenomena, which are in this case word patterns. Removing irrelevant and redundant features from the input data improves processing speed and efficiency by reducing the dimensionality of the problem. Feature selection, that is, choosing discriminating and independent features, is key to any pattern recognition algorithm, and also helps researchers to better understand the data, which features are important, and how they are related to one another.

In one embodiment of the present invention, a supervised learning approach (supervised method) uses a set of (mostly numerical) features (an n-dimensional "feature vector") that are chosen for their effectiveness in separating desired and undesired entries, and examples of documents together with collections of keywords that have been generated by humans (manually-constructed) are provided as training data to a machine learning algorithm. In another embodiment, an unsupervised method can use similar features selected for their sensitivity to parameters of relevance in ranking keywords, but in the absence of training data, it might use numeric values derived from the feature vectors to perform scoring and ranking of candidate entries. Subsequently, a number of candidate entries to be retained in a keyword collection can be selected using predetermined criteria for quality or for a desired number of entries. Thus the present invention provides both unsupervised and supervised embodiments of an automatic keyword extraction method.

Examples of algorithms and corresponding classifiers used in supervised and unsupervised methods include Naïve Bayes, Support Vector Machine (SVM), Relevance Vector Machine (RVM), decision tree, genetic algorithm, rule induction, k-Nearest Neighbors, Gaussian, Gaussian Mixture Model, artificial neural networks, multilayer perceptron, and radial basis function (RBF) networks.

Referring now to FIG. 1, a flow chart of an unsupervised method 100 for generating one or more keywords in accordance with one embodiment of the present invention is shown. The flow chart shows a minimum number of steps for simplicity. For example, Start and End points are not shown, but it should be understood that at the start, an input data set consisting of an electronic document containing text, or a collection of documents, in electronic form suitable for machine data processing is provided, for which an automatically-extracted set or collection of keywords is desired. Similarly, after the entire document or collection of documents is processed, the output after the last step shown is a set, list, or collection of keywords, or multiple collections, one for each input document, having a desired number of entries. Boxes having double left and right borders indicate subprograms, processes, or code segments that are elaborated in other exemplary figures.

Figure 3:
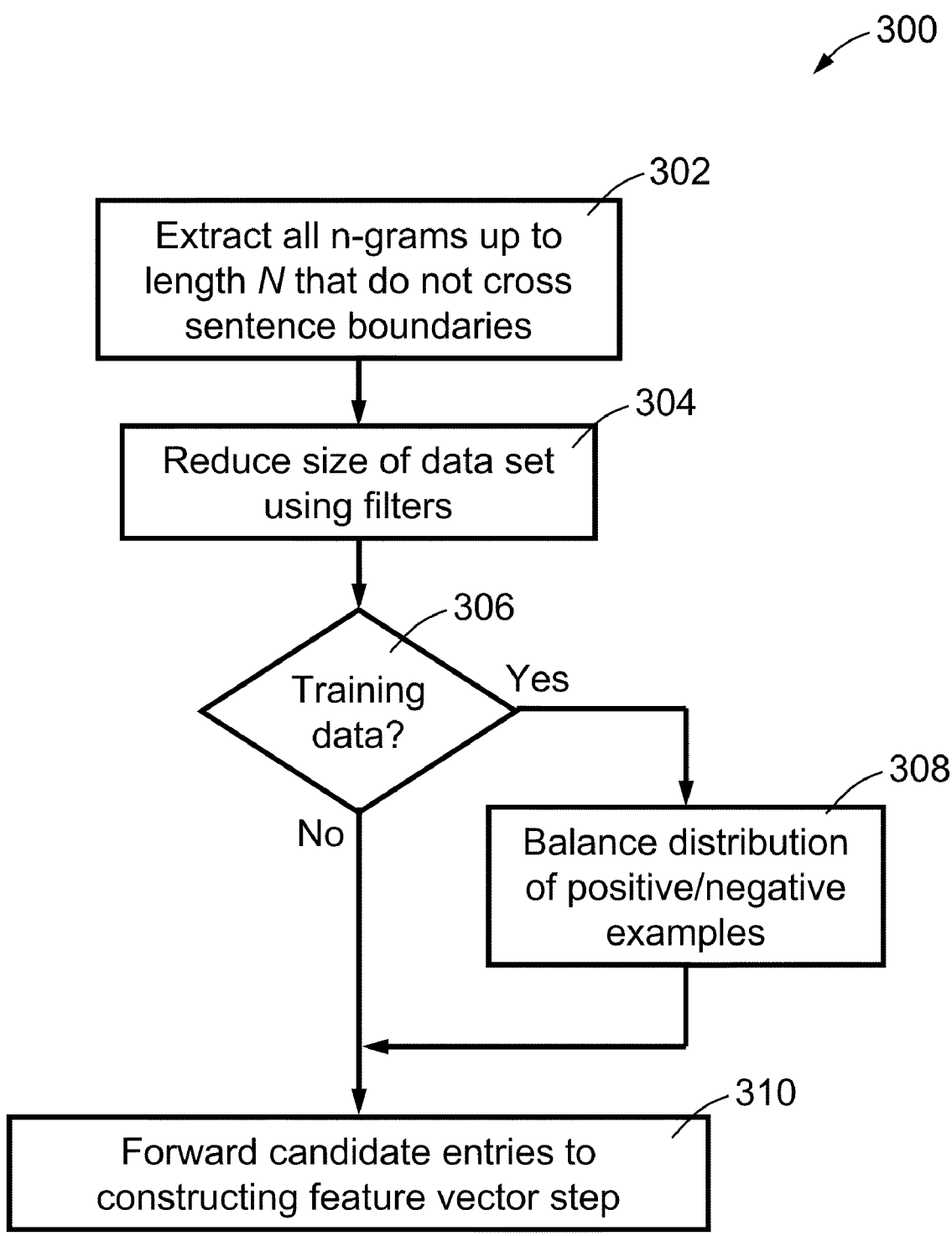
FIG. 3 depicts a flow chart of a method of identifying candidate entries in a data set in accordance with one embodiment of the present invention.
Figure 8:
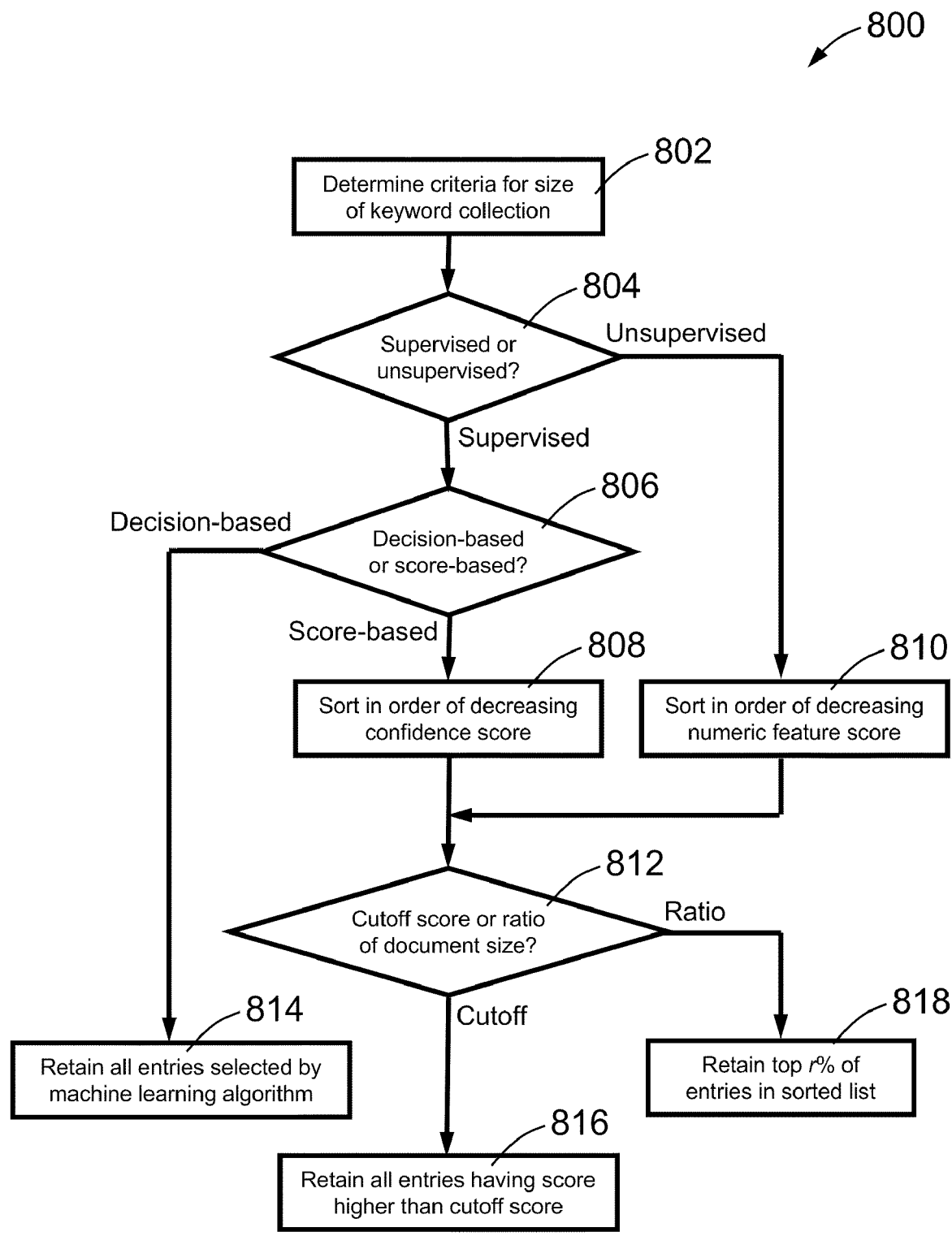
FIG. 8 depicts a flow chart of a method for selecting a number of entries to be retained in a keyword collection in accordance with one embodiment of the present invention.

The unsupervised method 100 shown in FIG. 1 begins in block 102 by processing the input document to identify candidate entries for consideration for inclusion as the final keywords. An example procedure for performing this step is shown in FIG. 3. After this step 102, a large number of candidate entries, particularly if they are extracted from a long document such as a book, may need to be evaluated. The candidate entries are processed starting in block 104, in which a feature vector is constructed for each candidate entry. More detail on the types of features that can be used is given later. Block 106 is the heart of the process, in which an algorithm, for example, one of several types of machine learning algorithms or a simple inner product calculation using predetermined weighting factors for the features, is run that processes the candidate entries in order to assign each a numeric score. For example, features and weights can be chosen so that higher numeric values for scores correspond to a higher probability of being a desirable keyword for inclusion in the final output collection or index. Finally, in block 108, the method uses predetermined criteria to select the entries that are to be retained in the output as keywords. An example method that can be used for this final down-selection of the output from either unsupervised or supervised keyword extraction methods is shown in FIG. 8, and will be discussed later.

Figure 2:
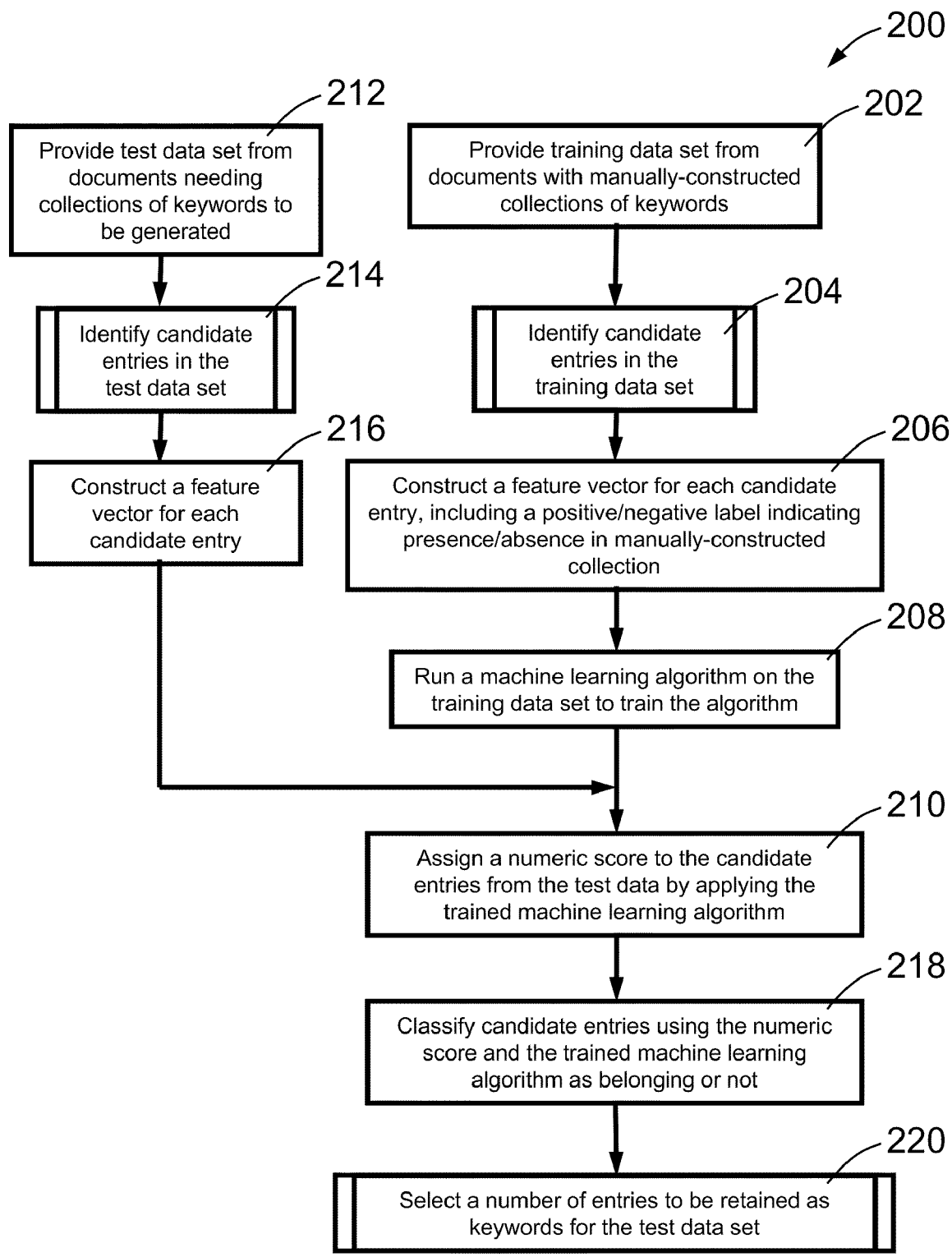
FIG. 2 depicts a flow chart of a supervised method for generating one or more keywords in accordance with another embodiment of the present invention.

Referring now to FIG. 2, a flow chart of a supervised method 200 for generating one or more keywords in accordance with another embodiment of the present invention is shown. As explained before, a significant difference from the unsupervised method is the provision of a separate training data set on which to train a machine learning algorithm. Note, however, that training data may be used prior to running an unsupervised algorithm, for example, to develop and calculate features for later use with the unsupervised algorithm. In the case of the supervised method 200, the training data set is provided in block 202, in which the training data can consist of one or more documents, or a large collection of documents, that have been provided with manually-constructed collections of keywords. As an example, the training set may consist of books in electronic form having back-of-the-book indexes that have been compiled by human authors or professional indexers, or of articles in electronic or online encyclopedias that have been provided manually with lists of keywords or keyword links therein. It is presumed that manually-constructed lists of keywords form "gold standard" references for a "good" index or keyword list in terms of usefulness, relevance and importance to the subject matter or domain-specific knowledge within the document, and inclusion of an appropriate number of keywords.

In order to use some collections of documents as a gold standard collection for automatic index construction, it may be necessary to eliminate the inversions, which are typical in human-built indexes. Inversion is a method used by professional indexers by which they break the ordering of the words in each index entry, and list the head first, thereby making it easier to find entries in an alphabetically ordered index. As an example, consider the entry indexing of illustrations, which, following inversion, becomes illustrations, indexing of. To eliminate inversion, an approach is used that generates each permutation of the composing words for each index entry, looks up the frequency of that permutation in the book, and then chooses the one with the highest frequency as the correct reconstruction of the entry. In this way, the form of the index entries as appearing in the book are identified, which is the form required for the evaluation of extraction methods. Entries that cannot be found in the book, which were most likely generated by the human indexers, are preserved in their original ordering.

Once the training data set is provided, it is processed in block 204 to identify candidate entries. This process is similar to that of the unsupervised method in FIG. 1 (block 102), and likewise can use as an example the process shown in FIG. 3. In block 206, a feature vector is constructed, as in the unsupervised method, but in addition another element is included in the feature vector for candidate entries extracted from the training data, which is a positive/negative label indicating whether or not, respectively, that candidate entry is found in the manually-constructed keyword collection for the training document. This enables training of a machine learning algorithm in block 208 by running the machine learning algorithm on the training data set. Once trained, the machine learning algorithm can then be used on other input data to make a binary yes/no classification decision on test data having no positive/negative labels, and thereby make decisions as to whether candidate entries should or should not be included among the output keyword collection or index.

A test data set is provided in block 212 from documents in need of automatic keyword extraction. In block 214, candidate entries are identified in the test data set, which may be the same type of process that has already been mentioned for block 204 (and 102) and that will be elaborated in FIG. 3. As it was for the training data set, a feature vector is constructed in block 216 for each candidate entry, but of course no prior indication as to whether it should be included in the collection or index is provided, so the positive/negative label feature is omitted from this feature vector. At this point, the trained machine learning algorithm can be run on the test data in block 210, with the result being either a numeric score, most generally, or simply a yes/no classification for each candidate entry. In block 218, each candidate entry is labeled by the machine learning algorithm as a keyword that passes the classification test or meets a predetermined numeric score criterion. Finally, in block 220, a method such as the one shown in FIG. 8 is used to select the entries that will be retained in the final output collection of keywords for the test data set.

An example data set from which to derive both training and test data to use in evaluating the algorithms and features of the present invention is a collection of books and monographs from the eScholarship Editions collection of the University of California Press (UC Press), consisting of 289 books, each with a manually constructed back-of-the-book index. The average length of the books in this collection is 86053 words, and the average length of the indexes is 820 entries. The UC Press collection is provided in a standardized XML format, following the Text Encoding Initiative (TEI) recommendations, and thus it is relatively easy to process the collection and separate the index from the body of the text. For training and evaluation purposes, a random split of the collection can be made into 90% training and 10% test. This yields a training corpus of 259 documents and a test data set of 30 documents. The following describes a process for identifying candidate entries using this training and test data set, giving exemplary values for numbers of entries and data set sizes.

Every sequence of words in a document such as a book represents a potential candidate for an entry in the keyword collection such as a back-of-the-book index. Thus, a first step is to extract from the training and the test data sets all the n-grams (in this example, up to the length of n=4), not crossing sentence boundaries. An "n-gram" is a sequence of n consecutive words out of the text. These represent the candidate index entries that will be used in the classification algorithm. Candidate entries from a training data set are then labeled as positive or negative, depending on whether the given n-gram was found in the back-of-the-book index associated with the book.

Using an n-gram-based method to extract candidate entries has the advantage of providing high coverage, but the unwanted effect of producing an extremely large number of entries. In fact, the resulting set is unmanageably large for any machine learning algorithm. Moreover, the set is extremely unbalanced, with a ratio of positive and negative examples of 1:675, which makes it unsuitable for most machine learning algorithms. In order to address this problem, it is desirable to find ways to reduce the size of the data set, possibly eliminating the training instances that will have the least negative effect on the usability of the data set.

The first step to reduce the size of the data set is to use candidate filtering techniques for unsupervised back-of-the-book index. Namely, stopword and comma filters are applied to both the training and the test collections. These filters work by eliminating all the n-grams that begin or end with a stopword (for example, a list of 300 most frequent English words), as well as those n-grams that cross a comma. This results in a significant reduction in the number of negative examples in the example training data set, from 48 to 11 million instances, with a loss in terms of positive examples of only 7.6%.

The second step is to use a technique for balancing the distribution of the positive and the negative examples in the data sets. There are several methods proposed in the existing literature, focusing on two main solutions: undersampling and oversampling. Undersampling means the elimination of instances from the majority class (in our case negative examples), while oversampling focuses on increasing the number of instances of the minority class. Aside from the fact that oversampling has hard-to-predict effects on classifier performance, it also has the additional drawback of increasing the size of the data set, which in our case is undesirable. For this example, an undersampling solution was adopted, where 10% of the negative examples are randomly selected for retention in the training data. This undersampling is applied only to the training set.

The following table shows the number of positive and negative entries in the UC Press data set, for the different preprocessing and balancing phases:

|  | Positive | Negative | Total | Positive:Negative Ratio |
| --- | --- | --- | --- | --- |
| Training Data |  |  |  |  |
| All (original) | 71,853 | 48,499,870 | 48,571,723 | 1:674.98 |
| Commonword/ comma filters | 66,349 | 11,496,661 | 11,563,010 | 1:173.27 |
| 10% undersampling | 66,349 | 1,148,532 | 1,214,881 | 1:17.31 |

-continued

|  | Positive | Negative | Total | Positive:Negative Ratio |
|---|---|---|---|---|
| Test Data |  |  |  |  |
| All (original) | 7,764 | 6,157,034 | 6,164,798 | 1:793.02 |
| Commonword/ comma filters | 7,225 | 1,472,820 | 1,480,045 | 1:203.85 |

These steps for identifying candidate entries in either test or training data are summarized in the method 300 shown in FIG. 3, which depicts a flow chart of a method of identifying candidate entries in a data set in accordance with an embodiment of the present invention. Block 302 represents the step of extracting all n-grams that do not cross sentence boundaries. The resulting list of n-grams is reduced in size using filters in block 304. A variety of filters may be used; in the example, the stopword and comma filters described earlier are applied. Decision block 306 takes into account whether the process is being performed on training data in a supervised method, or the test data in an unsupervised or supervised method. If the data is from a training data set, then in block 308, the distribution of positive and negative examples is balanced to an extent in order to improve the performance of the classifier performance in the machine learning algorithm. As an example, a random undersampling may be performed. After balancing the training data, or if the data set does not originate from training data and is not going to be used in a yes/no classifier, then after all data have been processed, this process 300 of identifying candidate entries is completed by implementing the step 310 of forwarding all of the candidate entries to later steps in the overall method of automatic keyword extraction.

We next describe novel features, as defined earlier, that can be used in the evaluation or classification of candidate phrases for inclusion in a collection of automatically-extracted keywords. As previously explained, an important step in the development of a supervised system is the choice of features used in the learning process. Ideally, any property of a word or a phrase indicating that it could be a good keyword should be represented as a feature and included in the training and test examples. A number of features, including information-theoretic features used in unsupervised keyword extraction, as well as a novel set of features based on syntactic and discourse properties of the text, or on information extracted from external knowledge repositories, are aspects of the present invention. These novel features are also of great utility in increasing the effectiveness of unsupervised methods.

First, a set of information-theoretic features are described, which are referred to here as the phraseness and informativeness features. A keyphrase is a sequence of one or more words that together can act as a keyword. Phraseness refers to the degree to which a sequence of words can be considered a phrase. It can be used as a measure of lexical cohesion of the component terms and can be treated as a parameter to be used in a collocation discovery problem. Informativeness represents the degree to which a keyword or keyphrase is representative for the document at hand, and it correlates to the amount of information conveyed to the user.

To measure the informativeness of a keyword or keyphrase, various methods can be used:

tf.idf, which is a traditional information retrieval metric, employed in most existing keyword extraction applications. It is a product of term frequency tf and inverse document frequency idf. In the present invention, inverse document frequency can be measured, for example, using the article collection of the online encyclopedia Wikipedia.

$\chi^2$ (chi-squared) independence test, which measures the degree to which two events happen together more often than by chance. In the present invention, the $\chi^2$ is used in a novel way. The informativeness of a keyphrase (or keyword) is measured by finding if the phrase (or word) occurs in the document more frequently than it would by chance. The information required for the $\chi^2$ independence test can be typically summed up in a contingency table:

|  | j = 1 | j = 2 |
|---|---|---|
| i = 1 | count(phrase in document) | count(all other phrases in document) |
| i = 2 | count(phrase in other documents) | count(all other phrases in all other documents) |

The independence score is calculated based on the observed (O) and expected (E) counts:

$$\chi^2 = \sum_{i,j} \frac{(O_{i,j} - E_{i,j})^2}{E_{i,j}}$$

where i, j are the row and column indices of the contingency table. The O counts are the cells of the table. The E counts are calculated from the marginal probabilities (the sum of the values of a column or a row) converted into proportions by dividing them with the total number of observed events (N):

$$N = O_{1,1} + O_{1,2} + O_{2,1} + O_{2,2}$$

Then the expected count for seeing the phrase in the document is:

$$E_{1,1} = \frac{O_{1,1} + O_{1,2}}{N} \times \frac{O_{1,1} + O_{2,1}}{N} \times N$$

To measure the phraseness of a candidate phrase, a technique based on the $\chi^2$ independence test can be used. Such a test measures the independence of the events of seeing the components of the phrase in the text. This method has been found to be one of the best performing models in collocation discovery. For n-grams where n>2, the $\chi^2$ independence test may be applied by splitting the phrase in two (e.g. for a 4-gram, by measuring the independence of the composing bigrams).

Figure 4:
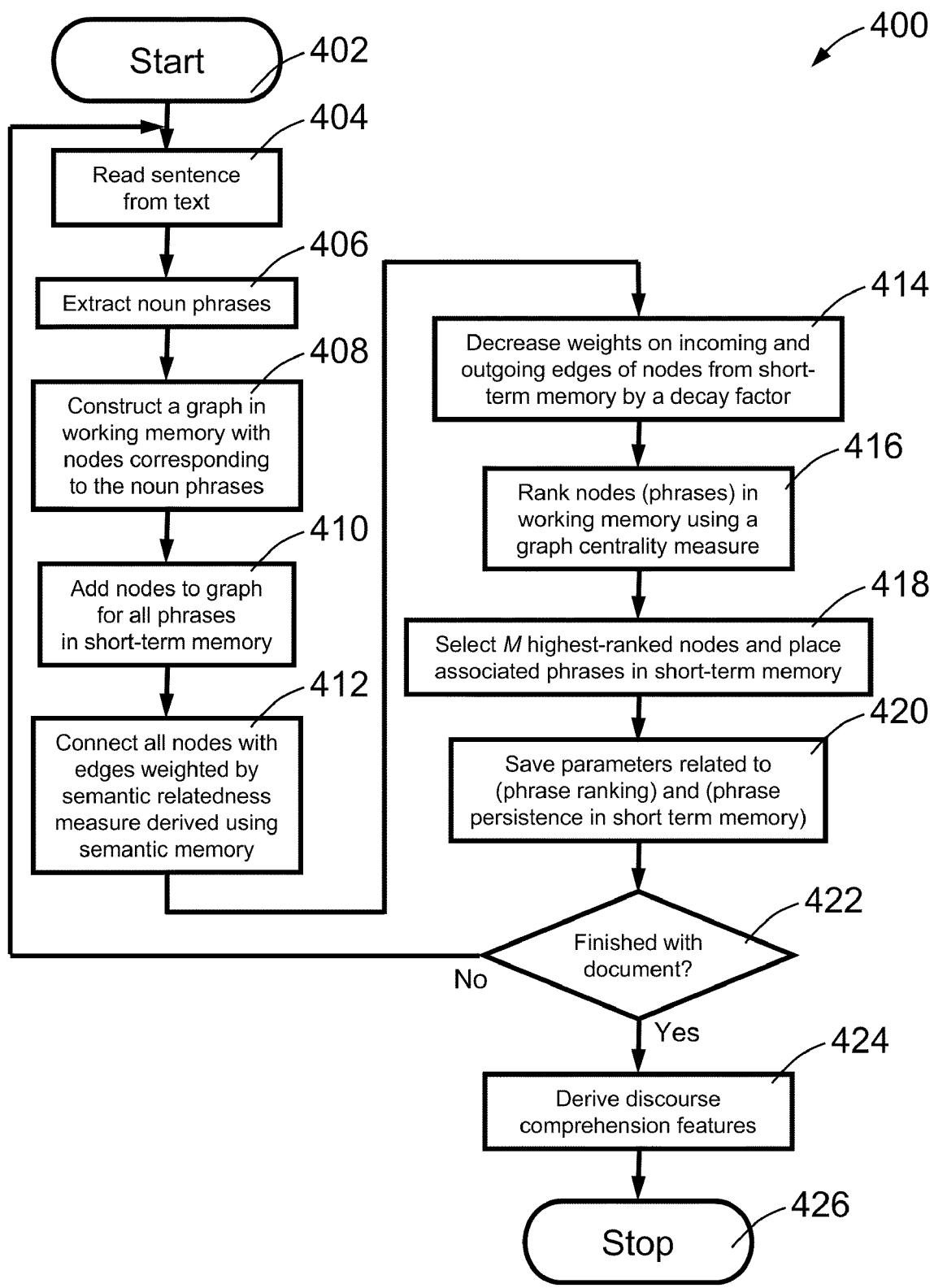
FIG. 4 depicts a flow chart of a process for deriving features based on discourse comprehension to be used in automatic keyword extraction in accordance with one embodiment of the present invention.

Next, novel features for keyword extraction, and methods for deriving them, are described that were inspired by work on discourse comprehension. A construction integration framework is used, which is the backbone used by many discourse comprehension theories. FIG. 4 depicts a flow chart of a process 400 for deriving features based on discourse comprehension to be used in automatic keyword extraction in accordance with one embodiment of the present invention. Before presenting a detailed discussion of these steps, first an overview will be provided of a novel construction integration approach for deriving discourse comprehension features.

Very few existing keyword extraction methods look beyond word frequency. Excepting the use of pointwise mutual information to improve the coherence of the keyword set, there does not appear to be any other work that attempts to use the semantics of the text to extract keywords. The fact that most systems rely heavily on term frequency properties poses serious difficulties, since many index entries appear only once in the document, and thus cannot be identified by features based solely on word counts. For instance, as many as 52% of the index entries in the previously-described example training data set appeared only once in the books they belong to. Moreover, another aspect not typically covered by current keyword extraction methods is the coherence of the keyword set, which can also be addressed by discourse-based properties.

Discourse comprehension is a field in cognitive science focusing on the modeling of mental processes associated with reading and understanding text. The most widely accepted theory for discourse comprehension is the construction integration theory. According to this theory, the elementary units of comprehension are propositions, which are defined as instances of a predicate-argument schema. As an example, consider the sentence The hemoglobin carries oxygen, which generates the predicate CARRY[HEMOGLOBIN,OXYGEN]. A processing cycle of the construction integration model processes one proposition at a time, and builds a local representation of the text in a working memory, called the propositional network.

Figure 5:
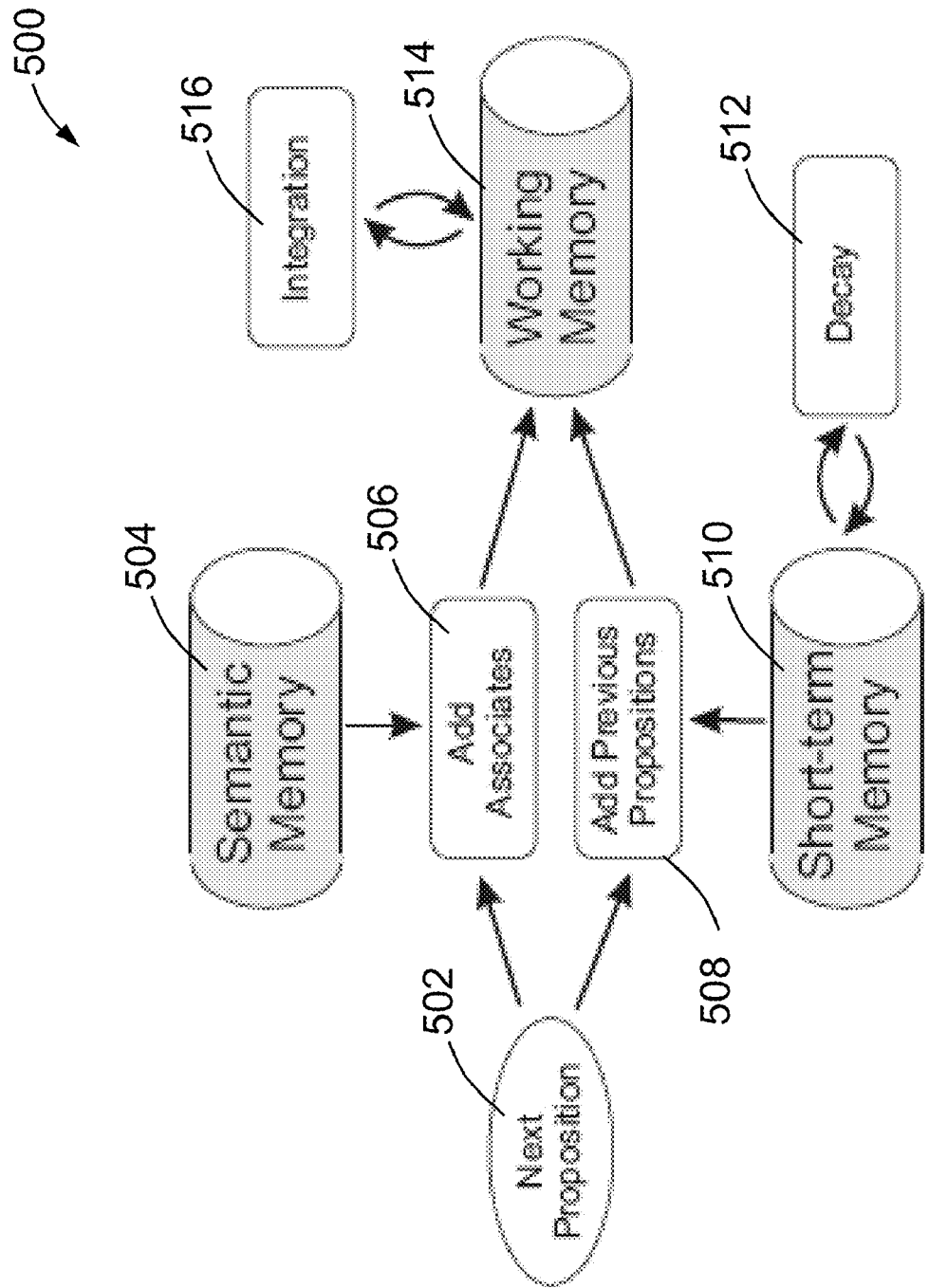
FIG. 5 depicts a schematic of a construction integration process used in deriving discourse comprehension features showing the types of memory used in accordance with one embodiment of the present invention.

Referring to FIG. 5, a schematic of a construction integration process 500 that can be used in deriving discourse comprehension features, showing types of memory used in accordance with one embodiment of the present invention, and a schematic of data flow during the main stages of the process are shown. The three types of memories shown schematically can be physically separated, of the same or different types, or simply areas within a program memory that is used by a computer program running in a processor implementing this process.

During a construction phase, propositions 502 are extracted from a segment of the input text (typically a single sentence) using linguistic features. The propositional network is represented conceptually within the working memory as a graph, with nodes consisting of propositions, and weighted edges representing the semantic relations between them. All the propositions generated from the input text are inserted into the graph, as well as all the propositions stored in a short-term memory 510. The short-term memory 510 contains the propositions that compose the representation of the previous few sentences. The second phase of the construction step is the addition of past experiences (or background knowledge), which are stored in a semantic (long-term) memory 504. This is accomplished by adding new elements to the graph in block 506, usually consisting of the set of closely related propositions from the semantic memory.

After processing a sentence, an integration step performed within working memory 514 establishes the role of each proposition in the meaning representation of the current sentence, through a spreading activation applied on the propositions derived from the original sentence. Once the weights are stabilized, the set of propositions with the highest activation values give the mental representation of the processed sentence. Propositions with the highest activation values are added to the short-term memory 510, the working memory 514 is cleared and the process moves to the next sentence.

The main purpose of the short-term memory 510 is to ensure the coherence of the meaning representation across sentences. By keeping the most important propositions 508 in the short-term memory, the spreading activation process transfers additional weight to semantically related propositions in the sentences that follow. This also represents a way of alleviating one of the main problems of statistical keyword extraction, namely the sole dependence on term frequency. Even if a phrase appears only once, the construction integration process ensures the presence of the phrase in the short-term memory as long as it is relevant to the current topic, thus being a good indicator of the phrase importance.

Note that the embodiment of a construction integration process for the present invention requires a number of adaptations of previous work used for different applications. A traditional construction integration model is not directly applicable to keyword extraction without modification due to a number of practical difficulties. The first implementation problem is the lack of a propositional parser. This problem can be solved in one embodiment of the present invention by using a shallow parser to extract noun phrase chunks from the original text. Second, since spreading activation is a process difficult to control, with several parameters that require fine tuning, a different graph centrality measure may be used, namely PageRank [Brin and Page, 1998].

Finally, to represent the relations inside the long term semantic memory, a variant of latent semantic analysis (LSA) is used, for example as implemented in the InfoMap package, trained on a corpus consisting of the British National Corpus, the English Wikipedia, and the books in another collection. To alleviate a data sparsity problem, pointwise mutual information (PMI) can also be used to calculate the relatedness of the phrases based on the book being processed.

An embodiment of a method 400 for deriving discourse comprehension features for automatic keyword extraction using a construction integration approach works by performing the steps enumerated in FIG. 4. After initiating the process 402, the following steps are repeated until all sentences in the input electronic document have been read: in block 404, a new sentence is read from the text; then noun phrases are extracted in block 406, for example by using a shallow parser; for each new sentence, a graph is constructed within a working memory in block 408, consisting of the noun phrase chunks extracted from the original text. This set of nodes is augmented with all the phrases from the short-term memory in block 410. Next, a weighted edge is added in block 412 between all the nodes, based on the semantic relatedness measured between the phrases. As described above, LSA and PMI may be used to derive a semantic relatedness measure. For example, a weighted combination of these two measures, with a weight of 0.9 assigned to LSA and 0.1 to PMI may be used. Then in block 414, the connection weights are adjusted (decreased) to account for memory decay, which is a function of the distance from the last occurrence. Memory decay can be implemented, for example, by decreasing the weight of both the outgoing and the incoming edges by m*$\alpha$, where m is the number of sentences since the phrase was last seen and $\alpha$ is a decay parameter less than 1, for example $\alpha$=0.1. After the graph has been so adjusted, then a graph centrality measure is used in block 416 to rank the nodes (phrases). As mentioned above, in one embodiment, the PageRank algorithm can be used for this purpose. Then in block 418, a small number M of the highest-ranked nodes are selected and their associated phrases placed in short-term memory. In one embodiment, M can be chosen to be 10. At this point, various parameters related to the ranking of the current phrases and how long they have persisted within the short-term memory are saved (block 420) to be used in computing discourse comprehension features. If there are sentences in the document or collection of documents that remain to be processed, then decision block 422 redirects the process back to the beginning to read the next sentence. If all sentences in the text have been processed, then in block 424 a number of discourse comprehension features may be computed for use in the machine learning algorithm or other decision process. These features are passed on to other steps in the keyword extraction process after this method is concluded in termination block 426.

At least three different exemplary useful features can be derived based on the construction integration (CI) model:
- CI short-term memory frequency (CI shortterm), which measures the number of iterations that the phrase remains in the short-term memory, which is seen as an indication of the phrase importance.
- CI normalized short-term memory frequency (CI normalized), which is the same as CI shortterm, except that it is normalized by the frequency of the phrase. Through this normalization, the effect of the semantic relatedness of the phrase to subsequent sentences is enhanced.
- CI maximum score (CI maxscore), which measures the maximum centrality score the phrase achieves across the entire book. This can be thought of as a measure of the importance of the phrase in a smaller coherent segment of the document.

Next, a method for deriving useful numeric features based on syntactic patterns is described. Previous work has pointed out the importance of syntactic features for supervised keyword extraction, but such features have had discrete and not numeric values, as would better suit them to ranking and classification algorithms. The construction integration model just described is already making use of syntactic patterns to some extent, through the use of a shallow parser to identify noun phrases. However, that approach does not cover patterns other than noun phrases. To address this limitation, a new numeric feature is introduced that captures the part-of-speech of the words composing a candidate phrase.

There are multiple ways to represent a part-of-speech feature. The simplest is to create a string feature consisting of the concatenation of the part-of-speech tags, as in the prior work. However, this representation imposes limitations on the machine learning algorithms that can be used, since many learning systems cannot handle string features. A second solution is to introduce a binary feature for each part-of-speech tag pattern found in the training and the test data sets. In many applications this is again unacceptable, given the size of documents such as books and the large number of syntactic patterns that can be extracted. Instead, a novel solution is presented which, rather than using the part-of-speech pattern directly, determines the probability of a phrase with a certain tag pattern to be selected as a keyphrase. Formally:

$$P(\text{pattern}) = \frac{C(\text{pattern, positive})}{C(\text{pattern})}$$

where C(pattern, positive) is the number of distinct phrases having the tag pattern pattern and being selected as a keyphrase, and C(pattern) represents the number of distinct phrases having the tag pattern pattern. This probability is estimated based on the training collection, and is used as a numeric feature. The name of this feature is part-of-speech pattern.

Figure 6:
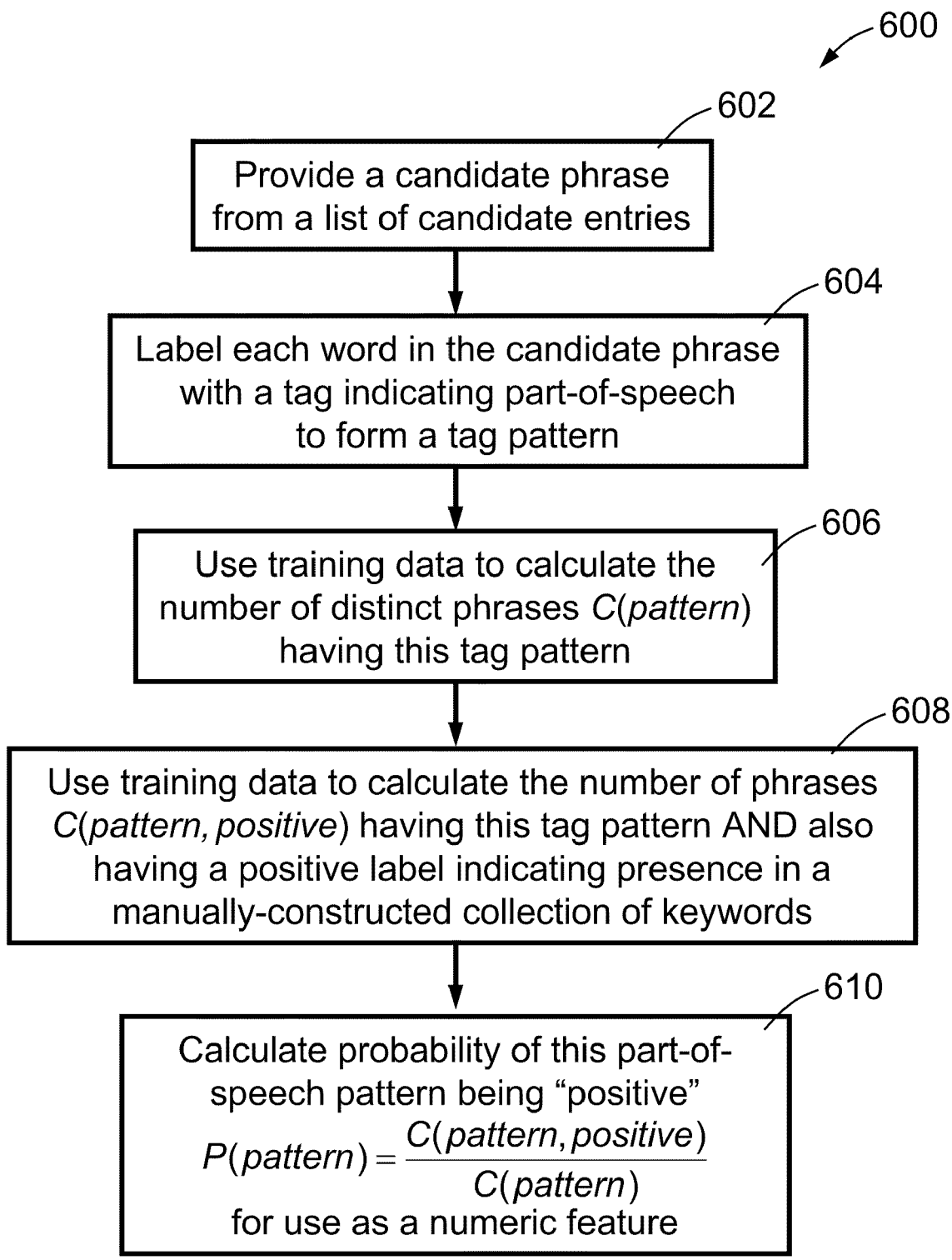
FIG. 6 depicts a flow chart of a method for deriving features based on syntactic patterns as features to be used with keywords in accordance with one embodiment of the present invention.

A method 600 to implement the calculation of a syntactic feature such as the numeric part-of-speech pattern feature is detailed in FIG. 6, which depicts a flow chart of a method for deriving features based on syntactic patterns in accordance with an embodiment of the present invention. A candidate phrase is provided in block 602 from a list of candidate entries. In block 604, each word in the candidate phrase is labeled with a tag indicating its part-of-speech (noun, verb, etc.) to form a tag pattern. Then training data are used to calculate the number C(pattern) of distinct phrases in the data that have this particular tag pattern. Next, the number of phrases that have this same tag pattern, but also have a positive label (or some other indicator or method of keeping track) indicating their presence in a list, collection, or set of keyphrases that has been manually constructed for the training data, is calculated in block 608, resulting in the value C(pattern, positive). Finally, in block 610, a numeric feature value corresponding to the probability that this part-of-speech pattern will belong to a manually-constructed collection of keyphrases (and therefore be a good keyphrase) is calculated as:

$$P(\text{pattern}) = \frac{C(\text{pattern, positive})}{C(\text{pattern})}.$$

Next another novel type of feature is introduced, called an encyclopedic annotation feature. Recent work has suggested the use of domain knowledge to improve the accuracy of keyword extraction. This is typically done by consulting a vocabulary of plausible keywords, usually in the form of a list of subject headings or a domain-specific thesaurus. The use of a vocabulary has the additional benefit of eliminating the extraction of incomplete phrases (e.g. "States of America").

Since large documents like books can cover several domains, the construction and use of domain-specific thesauruses is not plausible, as the advantage of such resources is offset by the time it usually takes to build them. Instead, encyclopedic information can be used as a way to ensure high coverage in terms of domains and concepts. Such encyclopedic information may be found online on the Internet in the form of articles that are linked by annotations to each other. For example, Wikipedia is an online encyclopedia that has grown to become one of the largest online repositories of encyclopedic knowledge, with millions of articles available for a large number of languages. In fact, Wikipedia editions are available for more than 200 languages, with a number of entries varying from a few pages to more than one million articles per language. Besides being the largest and the fastest growing encyclopedia available today, the structure of Wikipedia has the additional benefit of being particularly useful for the task of automatic keyword extraction. Wikipedia includes a rich set of links that connect important phrases in an article to their corresponding articles. These links are added manually by the Wikipedia contributors, and follow the general guidelines of annotation provided by Wikipedia. The guidelines coincide with the goals of keyword extraction, and thus the Wikipedia articles and their link annotations can be treated as a vast keyword annotated corpus.

Such encyclopedic annotations can be used in two ways. First, if a phrase is used as the title of a Wikipedia article, or as the anchor text in a link, this is a good indicator that the given phrase is well-formed. Second, the probability of a term W to be selected as a keyword in a new document can be estimated by counting the number of documents count($D_{key}$) where the term was already selected as a keyword, divided by the total number of documents count($D_W$) in which the term appeared:

$$P(\text{keyword} \mid W) = \frac{\text{count}(D_{key})}{\text{count}(D_W)}$$

These counts are collected from the entire set of Wikipedia articles. This probability can be interpreted as "the more often a term was selected as a keyword among its total number of occurrences, the more likely it is that it will be selected again." In the following, this feature is referred to as Wikipedia keyphraseness.

If there is a specific goal to create keywords that point to Wikipedia (or other electronic encyclopedia) articles, such as in the annotation application to be discussed later, then a controlled keyword vocabulary can be constructed that is intended to contain only the Wikipedia article titles (1,406,039 such titles are included in the March 2006 version of Wikipedia), and use this controlled vocabulary to extract keywords. One could simply construct such a vocabulary out of article titles. However, this would greatly restrict the potential to find all the keywords, since the actual use of a phrase within an article (surface form) may differ from the corresponding article title. For instance, different morphological forms such as e.g. "dissecting" or "dissections" can be linked to the same article title "dissection." By ignoring these morphological variations, it is likely that a good fraction of the keywords that appear in a form different than the Wikipedia titles would be missed. To address this problem, the controlled vocabulary can be extended with all the surface forms collected from all the Wikipedia articles. The Wikipedia keyphraseness probability feature could become unreliable for marginal cases where counts are very low. To fix this problem, one can simply subsequently discount all the occurrences that were used less than a predetermined small number (in this example, five) of times. After this process, the resulting controlled vocabulary consists of 1,918,830 terms.

Figure 7:
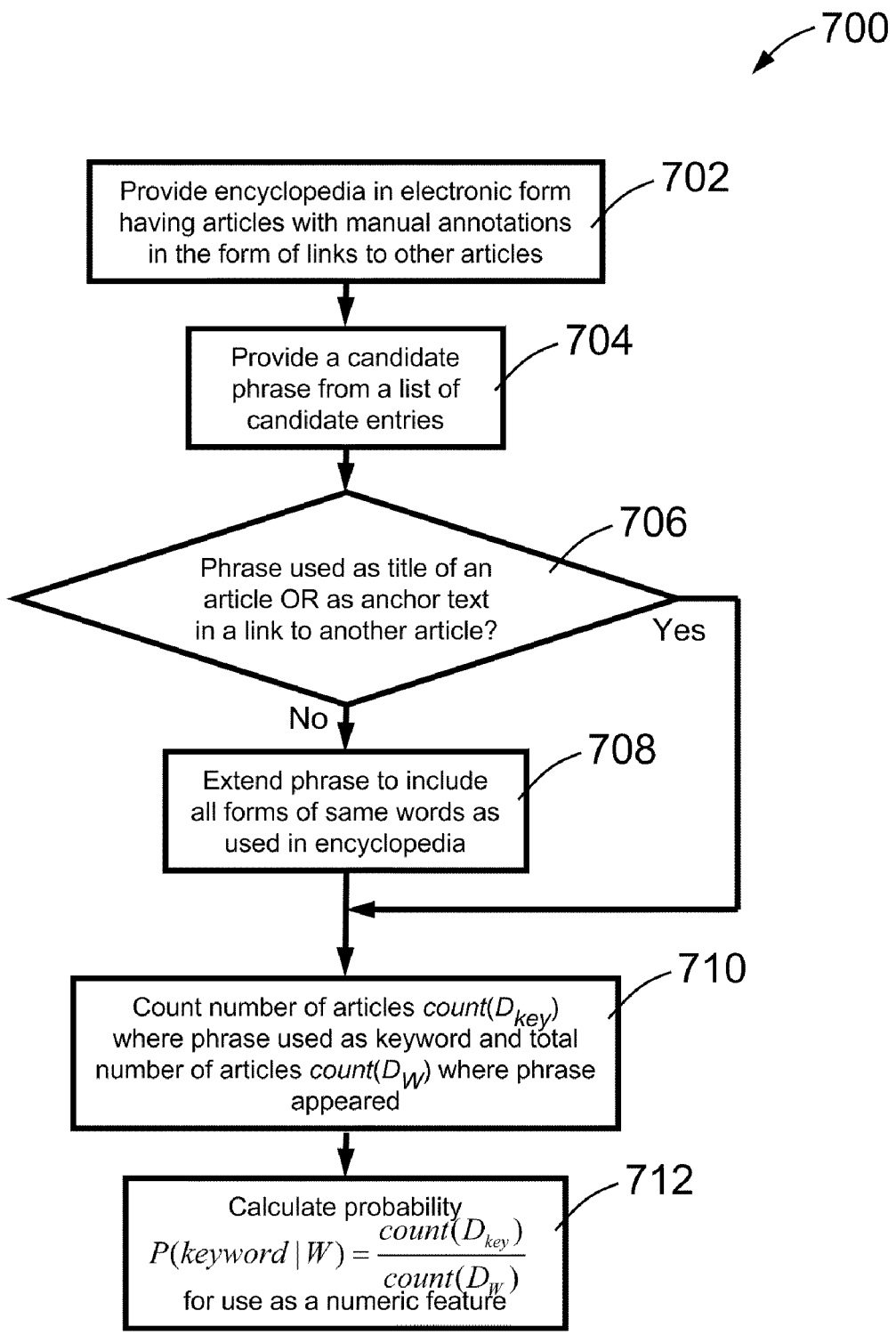
FIG. 7 depicts a flow chart of a method for deriving features based on annotations in an electronic encyclopedia as features to be used with keywords in accordance with one embodiment of the present invention.

Now refer to FIG. 7, showing a flow chart of a method 700 for using annotations in an electronic encyclopedia as features to be used with keywords in accordance with an embodiment of the present invention. In fact, this process and the calculated numeric feature that is its result, can be used either with algorithms such as in FIG. 1 and FIG. 2 for the basic keyword extraction task, or in combination with word sense disambiguation and annotation for application to the automatic annotation tasks to be discussed later in connection with FIG. 9. Starting with block 702, an electronic encyclopedia is provided having articles with annotations that have been manually added in the form of links to other articles, preferably in the same encyclopedia. Then a candidate phrase is provided in block 704 from a list of candidate entries, and the phrase is inspected to see if it is used as the title of an encyclopedia article, or as so-called "anchor text" within an article that serves to indicate a link to another article, preferably in the same encyclopedia. If so, then decision block 706 forwards the phrase to counting step 710, which counts the number of articles count($D_{key}$) in which the phrase is used as a keyword, and the total number of articles count($D_W$) in which the phrase appears at all. If the phrase is not found to be used as a title or a link, then morphological variations of the phrase are generated in block 708 and added to the list of candidates using all surface forms found in the encyclopedia, so as not to miss useful variations, and then those phrases are passed to block 710 for counting. Finally, a keyphraseness numeric feature is calculated for each phrase as the ratio of these two counts, indicating an approximation to the probability that the given phrase will be selected again as a keyword in annotating a new encyclopedia article.

Other features may also be included among those used in constructing feature vectors operated upon during the automatic keyword extraction process. In addition to the features described before, several other features can be added that are frequently used in keyword extraction: the frequency of the phrase inside the book (term frequency orf); the number of documents that include the phrase (document frequency or df); a combination of the two (tf.idf); the within-document frequency, which divides a book into for example ten equally-sized segments, and counts the number of segments that include the phrase (within document frequency); the length of the phrase (length of phrase); and finally a binary feature indicating whether the given phrase is a named entity, according to a simple heuristic based on word capitalization.

The features described above were integrated into a machine learning framework and was evaluated on the UC Press data set, consisting of 289 books, randomly split into 90% training (259 books) and 10% test (30 books). Three learning algorithms, selected for the diversity of their learning strategy, were evaluated: multilayer perceptron, SVM, and decision trees. For all three algorithms, their implementation available in the Weka package was used.

For evaluation, the standard information retrieval metrics were used: precision, recall, and F-measure. Two different mechanisms were used for selecting the number of entries in the index. In the first evaluation (ratio-based), a fixed ratio of 0.45% from the number of words in the text was used; for instance, if a book has 100,000 words, the index will consist of 450 entries. This number was estimated based on previous observations regarding the typical size of a back-of-the-book index (Csomai and Mihalcea, 2006). In order to match the required number of entries, all the candidates were sorted in reversed order of the confidence score assigned by the machine learning algorithm, and consequently the top entries in this ranking were selected. In the second evaluation (decision-based), the machine learning algorithm was allowed to decide on the number of keywords to extract. Thus, in this evaluation, all the candidates labeled as keywords by the learning algorithm will be added to the index. Note that all the evaluations are run using a training data set with 10% undersampling of the negative examples, as described before.

The results of the evaluation were:

| Algorithm | Ratio-based | | | Decision-based | | |
|---|---|---|---|---|---|---|
| | P | R | F | P | R | F |
| Multilayer perception | 27.98 | 27.77 | 27.87 | 23.93 | 31.98 | 27.38 |
| Decision tree | 27.06 | 27.13 | 27.09 | 22.75 | 34.12 | 27.30 |
| SVM | 20.94 | 20.35 | 20.64 | 21.76 | 30.27 | 25.32 | where P is Precision, R is Recall and F is F-measure. As can be seen, the multilayer perceptron and the decision tree provide the best results, for an overall average F-measure of 27%. Interestingly, the results obtained when the number of keywords is automatically selected by the learning method (decision-based) are comparable to those when the number of keywords is selected a-priori (ratio-based), indicating the ability of the machine learning algorithm to correctly identify the correct keywords.

Additionally, an experiment was run to determine the amount of training data required by the system. While the learning curve continues to grow with additional amounts of data, the steepest part of the curve is observed for up to 10% of the training data, which indicates that a relatively small amount of data (about 25 books) is enough to sustain the system.

It is worth noting that the task of creating back-of-the-book indexes is highly subjective. In order to put the performance figures in perspective, one should also look at the inter-annotator agreement between human indexers as an upper bound of performance. For example, the consistency studies that have been carried out on the MEDLINE corpus (Funk and Reid, 1983) found an inter-annotator agreement of 48% on an indexing task using a domain-specific controlled vocabulary of subject headings.

The performance of the system was compared with two other methods for keyword extraction. One is the tf.idf method, traditionally used in information retrieval as a mechanism to assign words in a text with a weight reflecting their importance. This tf.idf baseline system uses the same candidate extraction and filtering techniques as the supervised systems. The other baseline is the KEA keyword extraction system (Frank et al., 1999), a state-of-the-art algorithm for supervised keyword extraction. Very briefly, KEA is a supervised system that uses a Naïve Bayes learning algorithm and several features, including information theoretic features such as tf.idf and positional features reflecting the position of the words with respect to the beginning of the text. The KEA system was trained on the same training data set as used in the experiments.

The following table shows the performance obtained by these methods on the test data set. Since none of these methods have the ability to automatically determine the number of keywords to be extracted, the evaluation of these methods is done under the ratio-based setting, and thus for each method the top 0.45% ranked keywords are extracted.

| Algorithm | P | R | F |
|---|---|---|---|
| tf.idf | 8.09 | 8.63 | 8.35 |
| KEA | 11.18 | 11.48 | 11.32 |

Using an information gain weight as assigned by running a learning algorithm, an indication of the role played by each feature, and how well they discriminate between wanted and unwanted keywords, was determined using the UC Press data set described earlier. The following table lists features that are described above together with the weight associated with each feature. Higher weights indicate higher information gain, that is, they make a bigger difference in the sorting of the input data. Features having higher information gain weights are more effective features for classification, speeding the algorithm, and are thus preferred over other features.

| Feature | Weight |
|---|---|
| part-of-speech pattern | 0.1935 |
| CI shortterm | 0.1744 |
| Wikipedia keyphraseness | 0.1731 |
| CI maxscore | 0.1689 |
| CI shortterm normalized | 0.1379 |
| ChiInformativeness | 0.1122 |
| document frequency (df) | 0.1031 |
| tf.idf | 0.0870 |
| ChiPhraseness | 0.0660 |
| length of phrase | 0.0416 |
| named entity heuristic | 0.0279 |
| within document frequency | 0.0227 |
| term frequency (tf) | 0.0209 |

The features with the highest weight are the linguistically motivated features of the present invention, including syntactic (part-of-speech) patterns, the discourse comprehension (CI) features, and the Wikipedia keyphraseness encyclopedic annotation feature. The smallest weights belong to the information theoretic features, including term frequency and document frequency, that are most commonly used in prior art keyword extraction algorithms.

A number of features have been listed that are useful in either supervised or unsupervised methods for automatic keyword extraction. Either type of algorithm uses these features to perform either a decision process for inclusion with the final keywords (decision-based) or to perform a ranking of candidate entries based on numeric scores (score-based). Now it will be shown how a decision can be made regarding how many entries to retain in the final output.

Referring now to FIG. 8, a flow chart of a method for selecting a number of entries to be retained in a keyword collection accordance with an embodiment of the present invention is shown. First, in block 802, criteria are determined for the desired size of the final keyword collection, including which methods will be used for down-selection. For example, if in block 804 it is found that a supervised machine learning algorithm such as that of FIG. 2 is being executed, that uses a classifier to determine inclusion of candidate entries, then the algorithm can either be used in a decision-based fashion, or in a score-based fashion. In block 806, a supervised algorithm can choose between either a decision-based method, which leads to block 814 with the result that all entries that are classified as keywords by the machine learning algorithm are retained in the final output; or a score-based method, which requires that entries be sorted in block 808 in order of decreasing score determined, for example, as a confidence score derived by the machine learning algorithm. If an unsupervised method such as that of FIG. 1 is used, then a decision-based selection is not available, but score-based rankings are available from processing the features. Then in block 810, the candidates can be sorted in decreasing order of their numeric feature score, assuming that the algorithm arranges for higher scores to correspond to a higher probability of being a good keyword. Whether a sorted list of candidates results from a supervised or unsupervised algorithm, the list then passes through the decision block 812 in which it is determined how to use the ranked entries. If a cutoff score is to be applied to the ranked entries, then in block 816 all entries are retained that have a score higher than the cutoff. Another possibility is that there is a desired size (number of keywords) related to a ratio of the size of the input document. For back-of-the-book indexes, analysis of a collection of books might show that a typical number of entries in an index is a certain percentage r % of the number of words in the book. For example, a fixed ratio of 0.45% would result in an index containing 450 entries for a book of 100,000 words in length. In such a case, once the ratio is determined, in block 818 the top r % of entries from the sorted list are retained in the output collection.

According to an information gain measure of feature importance, the new features performed significantly better than the traditional frequency-based techniques, leading to a system with an F-measure of 27%. This represents an improvement of 140% with respect to a state-of-the-art supervised method for keyword extraction. The present invention proved to be successful both in ranking the phrases in terms of their suitability as index entries, as well as in determining the optimal number of entries to be included in the index. The present invention can be used for computer-assisted back-of-the-book indexing, as well as on the use of the automatically extracted indexes to improve the browsing of digital libraries.

Given a capability for high-quality automatic keyword extraction, and methods for deriving useful features and properties from electronic encyclopedia annotations, an advanced system is now described using these methods, together with the addition of word sense disambiguation, to provide the function of automatically annotating any text with links to electronic encyclopedia articles, following e.g. the Wikipedia guidelines.

Figure 9:
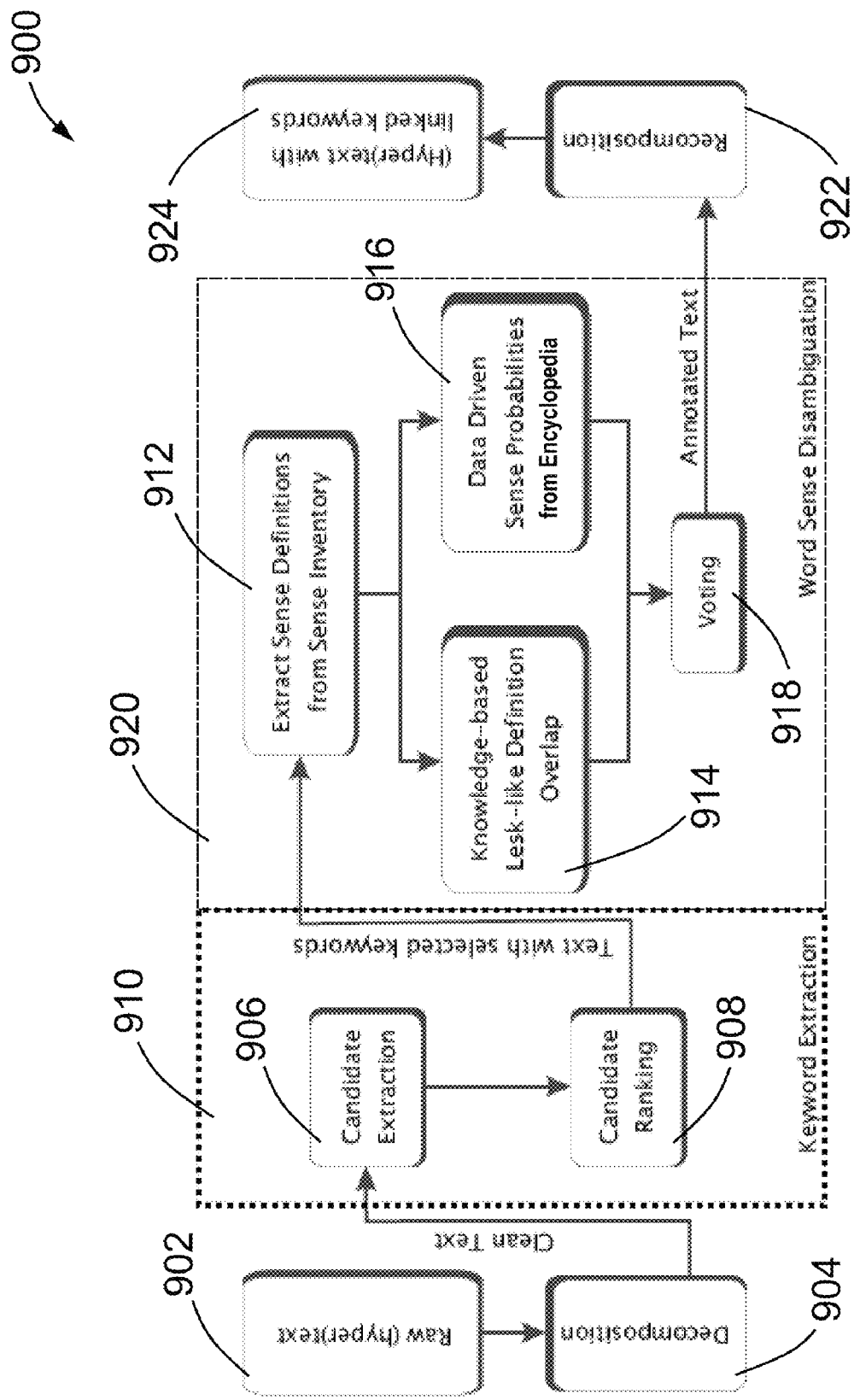
FIG. 9 depicts a flow chart of a process for automatic annotation of an electronic document with links to articles in an electronic encyclopedia in accordance with one embodiment of the present invention.

Referring now to FIG. 9, a system 900 is shown for automatic annotation of text with links to articles in an electronic encyclopedia. The basic approach is to first, identify those words and phrases that are considered important for the document at hand, and second, to find the correct encyclopedia (in the examples, Wikipedia) article that should be linked to a candidate keyword. The first task is essentially the task of keyword extraction that has already been discussed. The second task is analogous to the problem of word sense disambiguation, aiming at finding the correct sense of a word according to a given sense inventory. As shown in block 902, the input is raw text, or hypertext in the case of a web page. In block 904, if the text contains HTML tags, they are separated from the body text. Then the clean text is passed to the keyword extraction block 910, a keyword extraction module, which can use any of the methods heretofore discussed in connection with FIGS. 1-8. A simplified form of the unsupervised method of FIG. 1 is shown, with the key steps of candidate extraction 906 and candidate ranking 908 standing in for a more detailed description. Then the text annotated for the selected keywords is passed to block 920, a word sense disambiguation module, which resolves the link ambiguities and completes the annotations with the correct encyclopedia article reference. Finally, when all the annotations are ready, the structure of the original hypertext document is reconstructed in block 922, and the newly added reference links are included in the text in block 924.

More detail is now provided about what is meant by word sense disambiguation, and about the processes occurring within the word sense disambiguation module 920.

Ambiguity is inherent to human language. In particular, word sense ambiguity is prevalent in all natural languages, with a large number of the words in any given language carrying more than one meaning. For instance, the English noun plant can either mean green plant or factory; similarly the French word feuille can either mean leaf or paper. The correct sense of an ambiguous word can be selected based on the context where it occurs, and correspondingly the problem of word sense disambiguation is defined as the task of automatically assigning the most appropriate meaning to a polysemous word within a given context. Word sense ambiguity is also present within Wikipedia, with a large number of the concepts mentioned in the Wikipedia pages having more than one possible explanation (or "sense"). In the Wikipedia annotations, this ambiguity is solved through the use of links or piped links, which connect a concept to the corresponding correct Wikipedia article.

For instance, ambiguous words such as e.g. plant, bar, or chair are linked to different Wikipedia articles depending on the meaning they have in the context where they occur. Note that the links are manually created by the Wikipedia contributors, which means that they are most of the time accurate and referencing the correct article. The following represent five example sentences for the ambiguous word bar, with their corresponding Wikipedia annotations (links):

In 1834, Sumner was admitted to the [[bar (law)|bar]] at the age of twenty-three, and entered private practice in Boston.

It is danced in ¾ time (like most waltzes), with the couple turning approx. 180 degrees every [[bar (music)|bar]].

Vehicles of this type may contain expensive audio players, televisions, video players, and [[bar (counter)|bar]]s, often with refrigerators.

Jenga is a popular beer in the [[bar (establishment)|bar]]s of Thailand.

This is a disturbance on the water surface of a river or estuary, often cause by the presence of a [[bar (landform)|bar]] or dune on the riverbed.

Interestingly, these links can be regarded as sense annotations for the corresponding concepts, which is a property particularly valuable for the entities that are ambiguous. The ambiguity is related to the surface form of the concepts defined in Wikipedia, e.g. the word bar that can be linked to five different Wikipedia pages depending on its meaning Note that although Wikipedia defines the so-called disambiguation pages, meant as a record of word meanings, the disambiguation pages do not always account for all the possible surface form interpretations. For instance, there are several Wikipedia pages where the ambiguous word bar is sometimes linked to the pages corresponding to nightclub or public house, but these meanings are not listed on the disambiguation page for bar.

Regarded as a sense inventory, Wikipedia has a much larger coverage than a typical English dictionary, in particular when it comes to entities (nouns). This is mainly due to the large number of named entities covered by Wikipedia (e.g. Tony Snow, Washington National Cathedral), as well as an increasing number of multi-word expressions (e.g. mother church, effects pedal). For instance, in the March 2006 version, there were counted a total of 1.4 million entities defined in Wikipedia, referred by a total of 4.5 million unique surface forms (anchor texts), accounting for 5.8 million unique Wikipedia word "senses" (where a "sense" is defined as the unique combination of a surface form and a link to a Wikipedia entity definition). Other sense inventories are available, but Wikipedia seems to provide the largest. The sense inventory and access to its entries is indicated in FIG. 9 by block 912.

Two different disambiguation algorithms have been implemented and evaluated, inspired by two main trends in word sense disambiguation research. These are a knowledge-based method and a data-based method. Note that the two approaches can be used individually by choosing one, or by using both in combination in order to achieve higher accuracy, as described in the following.

The first disambiguation method uses a knowledge-based approach, which relies exclusively on information drawn from the definitions provided by the sense inventory. This method is inspired by the Lesk algorithm [Lesk, 1986], and attempts to identify the most likely meaning for a word in a given context based on a measure of contextual overlap between the dictionary definitions of the ambiguous word— here approximated with the corresponding Wikipedia pages, and the context where the ambiguous word occurs (for example, the current paragraph may be used as a representation of the context). Function words and punctuation are removed prior to the matching. For instance, given the context "it is danced in ¾ time, with the couple turning 180 degrees every bar", and assuming that "bar" could have the meanings of bar music or bar counter, the Wikipedia pages are processed for both the music and counter meanings, and consequently determine the sense that maximizes the overlap with the given context. Block 914 in FIG. 9 indicates the processing of the phrase given sense definitions and a knowledge-based algorithm.

The second approach is a data-driven method that integrates both local and topical features into a machine learning classifier. For each ambiguous word, a training feature vector is extracted for each of its occurrences inside a Wikipedia link, with the set of possible word senses being given by the set of possible links in Wikipedia. To model feature vectors, the current word and its part-of-speech are used, a local context of three words to the left and right of the ambiguous word, the parts-of-speech of the surrounding words, and a global context implemented through sense-specific keywords determined as a list of at most five words occurring at least three times in the contexts defining a certain word sense. The numbers of words in these groups are given here in the context of an example, and thus can be changed without departing from the spirit and scope of the present invention. The parameters for sense-specific keyword selection were determined through cross-fold validation on the training set. The features can be integrated for example in a Naïve Bayes classifier, selected mainly for its performance in previous work showing that it can lead to a state-of-the-art disambiguation system given the features that have been listed, or any of the similar types of classifiers and machine learning algorithms that have been previously listed. Block 916 indicates processing of keywords using a data-driven algorithm.

Given the orthogonality of the knowledge-based and the data-driven approaches, a voting scheme as mentioned earlier can optionally be implemented, meant to filter out the incorrect predictions by running both and seeking agreement between the two methods. Since it has been noticed that the two methods disagree in their prediction in about 17% of the cases, this disagreement can be used as an indication of potential errors, and consequently annotations that lack agreement can be ignored or removed from consideration. In the system shown in FIG. 9, the function of comparing the results from blocks 914 and 916, corresponding to the predictions of the two types of algorithms, is indicated by the "Voting" block 918.

Again, when all the annotations are ready, the structure of the original hypertext document is reconstructed in block 922, and the newly added reference links are included in the text in block 924, and the method of 900 is completed, resulting in at least one fully-processed electronic document containing links to encyclopedia articles as indicated by e.g. highlighted forms of the keywords.

Thus, a method for automatically annotating electronic documents with links to related information in an electronic encyclopedia has been demonstrated. Specifically, given an input document, the system 900 has the ability to identify the important concepts in a text (keyword extraction), and then link these concepts to corresponding encyclopedia articles such as Wikipedia pages (word sense disambiguation).

To evaluate the accuracy of the disambiguation algorithms, a gold-standard data set consisting of a collection of pages from Wikipedia was used, containing manual "sense" annotations made by the Wikipedia contributors. As mentioned before, the "sense" annotations correspond to the links in a Wikipedia page, which uniquely identify the meaning of the corresponding words. The same set of pages used during the keyword extraction evaluation was used, namely 85 Wikipedia pages containing 7,286 linked concepts.

Since the focus of this particular evaluation is on the quality of the disambiguation system, the keyword extraction and the word sense disambiguation evaluations were detached, and it was assumed that the keyword extraction stage produces 100% precision and recall. This assumption helps avoid the error propagation effect, and consequently isolate the errors that are specific to the word sense disambiguation module. An evaluation of the entire system is reported in the following section.

The set of keywords were manually selected by the Wikipedia contributors within the dataset of 85 pages, and for each such keyword the word sense disambiguation method was used to automatically predict the correct "sense," i.e. the correct link to a Wikipedia definition page.

For instance, given the context "Jenga is a popular beer in the [[bar (establishment)|bar]]s of Thailand.", we will attempt to disambiguate the word "bar," since it has been marked as a candidate Wikipedia concept. We therefore try to automatically predict the title of the Wikipedia page where this concept should be linked, and evaluate the quality of this prediction with respect to the gold standard annotation bar (establishment).

Evaluations of word sense disambiguation systems typically report on precision and recall, where precision is defined as the number of correctly annotated words divided by the total number of words covered by the system, and recall is defined as the number of correct annotations divided the total number attempted by the system.

The gold standard data set includes all the words and phrases that were marked as Wikipedia links in the 85 test articles, which amount to a total of 7,286 candidate concepts. Out of these, about 10% were marked as "unknown"—indicating that the corresponding surface form was not found in other annotations in Wikipedia, and therefore the system did not have any knowledge about the possible meanings of the given surface form. For instance, the surface form "Conference Championship" is a candidate concept in one of our test pages; however, this surface form was not encountered anywhere else in Wikipedia, and therefore since we do not have any sense definitions for this phrase, we mark it as "unknown." These cases could not be covered by the system, and they account for the difference between the total number of 7,286 concepts in the data set, and the "attempted" counts listed in Table 2 below.

Precision, recall and F-measure figures for the three disambiguation algorithms are shown below:

TABLE 2

| Method | Words | | Evaluation | | |
|---|---|---|---|---|---|
| | (A) | (C) | (P) | (R) | (F) |
| Baselines | | | | | |
| Random Baseline | 6,517 | 4,161 | 63.84 | 56.90 | 60.17 |
| Most frequent use | 6,517 | 5,672 | 87.03 | 77.57 | 82.02 |
| Word sense disambiguation methods | | | | | |
| Knowledge-based | 6,517 | 5,255 | 80.63 | 71.86 | 75.99 |
| Feature-based learning | 6,517 | 6,055 | 92.91 | 83.10 | 87.73 |
| Combined | 5,433 | 5,125 | 94.33 | 70.51 | 80.69 |

The table also shows the performance of an unsupervised baseline algorithm that for each candidate concept randomly selects one of its possible senses, and the performance of the most frequent sense baseline using counts derived from Wikipedia.

Perhaps not surprising, the data-driven method outperforms the knowledge-based method both in terms of precision and recall. This is in agreement with previously published word sense disambiguation results on other sense annotated data sets. Nonetheless, the knowledge-based method proves useful due to its orthogonality with respect to the data-driven algorithm. The voting scheme combining the two disambiguation methods has the lowest recall, but the highest precision. This is not surprising since this third system tagged only those instances where both systems agreed in their assigned label. We believe that this high precision figure is particularly useful for the Wikify! system, as it is important to have highly precise annotations even if the trade-off is lower coverage.

Note that these evaluations are rather strict, as we give credit only to those predictions that perfectly match the gold standard labels. We thus discount a fairly large number of cases where the prediction and the label have similar meaning For instance, although the system predicted Gross domestic product, as a label for the concept "GDP", it was discounted for not matching the gold-standard label GDP, despite the two labels being identical in meaning There were also cases where the prediction made by the system was better than the manual label, as in e.g. the label for the concept football in the (British) context playing football, wrongly linked to Association football by the Wikipedia annotator, and correctly labeled by the automatic system as football (soccer).

The final disambiguation results are competitive with figures recently reported in the word sense disambiguation literature. For instance, the best system participating in the recent Senseval/Semeval fine-grained English all-words word sense disambiguation evaluation reported a precision and recall of 59.10%, when evaluated against WordNet senses. In the coarse-grained word sense disambiguation evaluation, which relied on a mapping from WordNet to the Oxford Dictionary, the best word sense disambiguation system achieved a precision and recall of 83.21%.

The present invention also provides a Wikify! System that integrates the keyword extraction algorithm, automatically identifies the important keywords in the input document, and the word sense disambiguation algorithm that assigns each keyword with the correct link to a Wikipedia article. The Wikify! system brings together the capabilities of the keyword extraction and the word sense disambiguation systems under a common system that has the ability to automatically "wikify" any input document. Given a document provided by the user or the URL of a webpage, the system processes the document provided by the user, automatically identifies the important keywords in the document, disambiguates the words and links them to the correct Wikipedia page, and finally returns and displays the "wikified" document. The interface allows the user to either (1) upload a local text or html file, or (2) indicate the URL of a webpage. The user also has the option to indicate the desired density of keywords on the page, ranging from 2%-10% of the words in the document (default value: 6%), as well as the color to be used for the automatically generated links (default color: red). The Wikify! system is then launched, which will process the document provided by the user, automatically identify the important keywords in the document, disambiguate the words and link them to the correct Wikipedia page, and finally return and display the "wikified" document. Note that when an URL is provided, the structure of the original webpage is preserved (including images, menu bars, forms, etc.), consequently minimizing the effect of the Wikify! system on the overall look-and-feel of the webpage being processed.

In addition to the evaluations concerning the individual performance of the keyword extraction and word sense disambiguation methods, the overall quality of the Wikify! System was evaluated. A Turing-like test concerned with the quality of the annotations of the Wikify! system as compared to the manual annotations produced by Wikipedia contributors was designed. In this test, human subjects were asked to distinguish between manual and automatic annotations. Given a Wikipedia page, we provided the users with two versions: (a) a version containing the original concept annotations as originally found in Wikipedia, which were created by the Wikipedia contributors; and (b) a version where the annotations were automatically produced using the Wikify! system. Very briefly, the second version was produced by first stripping all the annotations from a Wikipedia webpage, and then running the document through the Wikify! system, which automatically identified the important concepts in the page and the corresponding links to Wikipedia pages.

The dataset for the survey consisted of ten randomly selected pages from Wikipedia, which were given to 20 users with mixed professional background (graduate and undergraduate students, engineers, economists, designers). For each page, the users were asked to check out the two different versions that were provided, and indicate which version they believed was created by a human annotator. Note that the order of the two versions (human, computer) was randomly swapped across the ten documents, in order to avoid any bias.

Over the entire testbed of 200 data points (20 users, each evaluating 10 documents), the "human" version was correctly identified only in 114 cases, leading to an overall low accuracy figure of 57% (standard deviation of 0.15 across the 20 subjects).

An "ideal" Turing test is represented by the case when the computer and human versions are indistinguishable, thus leading to a random choice of 50% accuracy. The small difference between the accuracy of 57% achieved by the subjects taking the test and the ideal Turing test value of 50% suggests that the computer-generated and human-generated Wikipedia annotations are hardly distinguishable, which is an indication of the high quality of the annotations produced by the Wikify! system.

Figure 10:
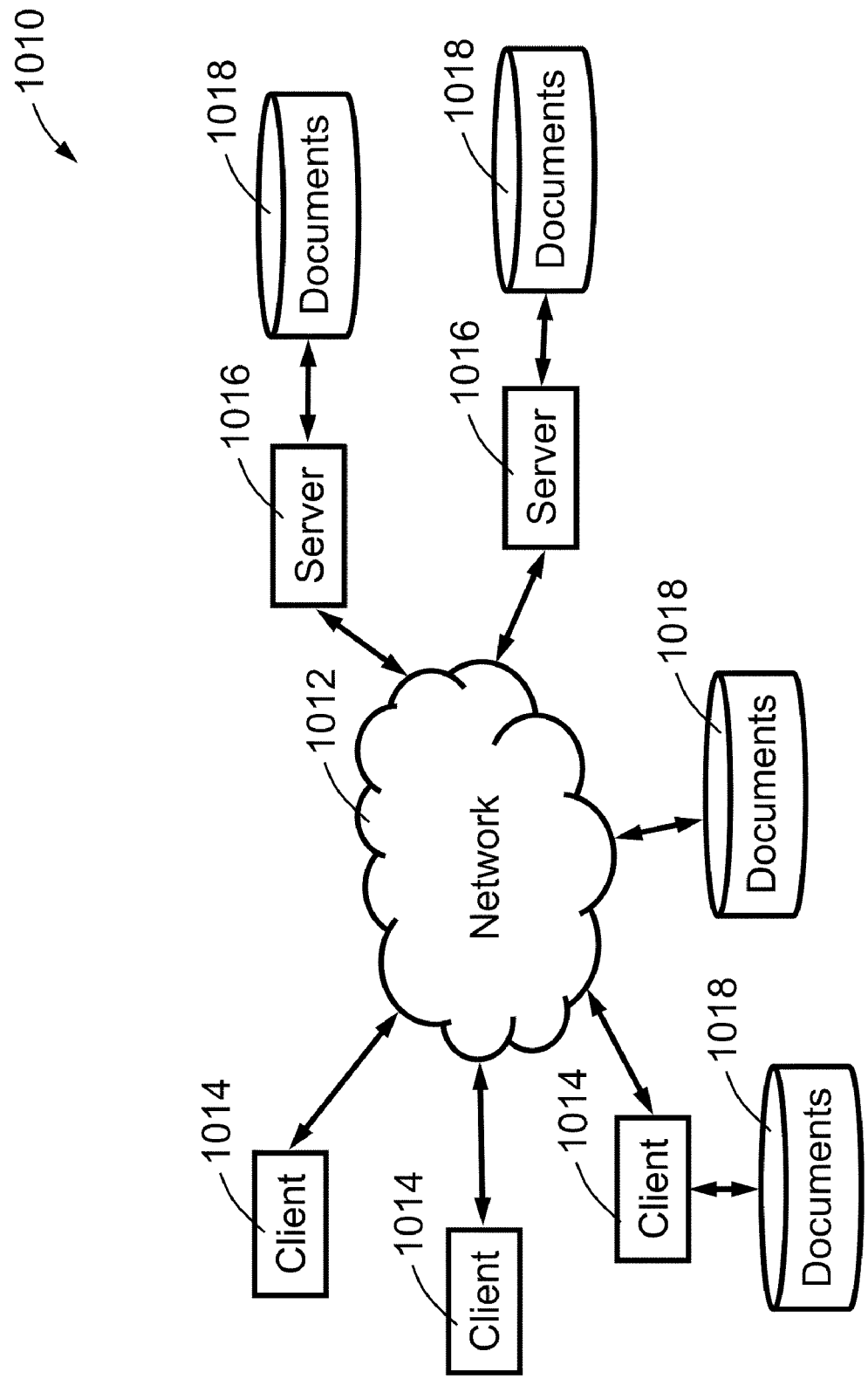
FIG. 10 depicts a block diagram of a system in accordance with one embodiment of the present invention.

Now referring to FIG. 10, a block diagram of a system 1010 in accordance with one embodiment of the present invention is shown. The system includes a network 1012, one or more client computers 1014 communicably connected to the network 1012 and one or more server computers 1016 communicably connected to the network 1012. The network 1012 can be private or public, and can include a local area network, a wide area network, the Internet, or any other type of communications system. Note that communicably connected means any means of communication between two devices, including, but not limited to, a hard-wired connection, a wireless or cellular connection, a satellite connection, an infrared or optical connection, or any suitable communications link or combination thereof. In addition, a repository for document storage 1018 and other resources (not shown) are typically communicably connected to the network 1012 for access or use by the client computers 1014 and server computers 1016. The document storage repository can be a library or a database distributed over a network. For example, the server computers 1016 can be communicably connected to separate document storage repositories 1018. Alternatively, the document storage can be provided attached to, or within, one or more of the client computers 1014, or separately attached directly to the network 1012. The documents may include searchable electronic files, abstracts, documents such as books, news articles, encyclopedia articles, audio files of spoken words, summaries, graphics containing searchable text, images containing searchable text, web pages, or combinations thereof.

The client computers 1014 can each be a mainframe, desktop, minicomputer, computer workstation, laptop computer, terminal, mobile computing device, mobile communications device, personal data assistant ("PDA"), or any other local or remote device in which it is desirable to access, use or process text, hypertext, or speech-to-text documents. Client computers 1014 typically include a browser, terminal program, or other software that allows a user to interface with the other client computers 1014, server computers 1016, document storage repositories 1018, or other resources communicably connected to the network 1012. The various inventions described above in reference to FIGS. 1-9 can be implemented in the system 1010 by running the processes on the server computers 1016, client computers 1014, or a combination thereof. For example, a user operating a client computer could run the processes on a server computer or on another client computer. The server computers 1016 and client computers 1014 typically include an interface to the document repository 1018, a memory, and a processor communicably connected to the interface and the memory.

There are many applications that could benefit from such a system of automatic annotation and linking. First, the vision of the Semantic Web is to have semantic annotations readily available inside the webpages, which will allow for a new semantically-oriented way of accessing information on the Web. The annotations produced by the system can be used to automatically enrich online documents with references to semantically related information, which is likely to improve the Web users' overall experience. Second, in educational applications, it is important for students to have fast access to additional information relevant to the study material. The system could serve as a convenient gateway to encyclopedic information related to assignments, lecture notes, and other teaching materials, by linking important terms to the relevant pages in Wikipedia or elsewhere. In addition, the system can also be used by the Wikipedia users, where the system can provide support for the manual annotation process by suggesting keywords and links. Finally, a number of text processing problems are likely to find new solutions in the rich text annotations produced by the system. Wikipedia has already been successfully used in several natural language processing applications, and automatic Wikipedia-style annotation of documents will likely prove useful in a number of text processing tasks such as e.g., summarization, entailment, text categorization, and others.

The present invention provides improved methods for automatic keyword extraction and word sense disambiguation. Novel features for use by machine learning algorithms in keyword extraction are introduced, that have further applications in other areas of natural language processing using computer data processing systems. For example, language processing can ultimately be applied to processing speech as well as text. In addition, these inventive methods can be combined to produce automatically annotated text with links to electronic encyclopedias. Other combinations of the inventive elements can lead to other automated applications in natural language processing. While the algorithms and derivations presented here were all described in relation to English language examples, the methods can be equally well applied to other languages. For example, Wikipedia editions are available in more than 200 languages, and thus the encyclopedic features and applications herein described can be readily translated.

The following references are hereby incorporated by reference in their entirety:

A. Csomai and R. Mihalcea, 2008. Linguistically Motivated Features for Enhanced Back-of-the-Book Indexing. To be published in Proceedings of the 46$^{th}$ Annual Meeting of the Association for Computational Linguistics: Human Language Technologies. Columbus, Ohio, Jun. 15-20, 2008, and R. Mihalcea and A. Csomai, 2007. Wikify! Linking Documents to Encyclopedic Knowledge. Proceedings of the sixteenth ACM Conference on Information and Knowledge Management. Lisbon, Portugal, Nov. 6-8, 2007, pp. 233-242, P. D. Turney, U.S. Pat. No. 6,470,307 B1. Method and apparatus for automatically identifying keywords within a document. Oct. 22, 2002.

S. F. Adafre and M. de Rijke. Finding similar sentences across multiple languages in Wikipedia. In Proceedings of the EACL Workshop on New Text, Trento, Italy, 2006.

T. Berners-Lee, J. Hendler, and O. Lassila. The Semantic Web. Scientific American, 1(501), May 2001.

R. Bunescu and M. Pasca. Using encyclopedic knowledge for named entity disambiguation. In Proceedings of the European Conference of the Association for Computational Linguistics, Trento, Italy, 2006.

S. Drenner, M. Harper, D. Frankowski, J. Riedl, and L. Terveen. Insert movie reference here: a system to bridge conversation and item-oriented web sites. In Proceedings of the SIGCHI conference on Human Factors in computing systems, pages 951-954, New York, N.Y., USA, 2006. ACM Press.

A. Faaborg and H. Lieberman. A goal-oriented Web browser. In Proceedings of the SIGCHI conference on Human Factors in computing systems, pages 751-760, Montreal, Canada, 2006.

E. Gabrilovich and S. Markovitch. Overcoming the brittleness bottleneck using wikipedia: Enhancing text categorization with encyclopedic knowledge. In Proceedings of the National Conference on Artificial Intelligence (AAAI), Boston, 2006.

J. Giles. Internet encyclopaedias go head to head. Nature, 438(7070):900-901, 2005.

A. Gliozzo, C. Giuliano, and C. Strapparava. Domain kernels for word sense disambiguation. In Proceedings of the 43th Annual Meeting of the Association for Computational Linguistics, Ann Arbor, Mich., 2005.

C. Gutwin, G. Paynter, I. Witten, C. Nevill-Manning, and E. Frank. Improving browsing in digital libraries with keyword indexes. Decision Support Systems, 27(1-2):81-104, 1999.

A. Hulth. Improved automatic keyword extraction given more linguistic knowledge. In Proceedings of the 2003 Conference on Empirical Methods in Natural Language Processing, Japan, August 2003.

C. Jacquemin and D. Bourigault. Term Extraction and Automatic Indexing. Oxford University Press, 2000.

Y. Lee and H. Ng. An empirical evaluation of knowledge sources and learning algorithms for word sense disambiguation. In Proceedings of the 2002 Conference on Empirical Methods in Natural Language Processing (EMNLP 2002), Philadelphia, June 2002.

M. Lesk. Automatic sense disambiguation using machine readable dictionaries: How to tell a pine cone from an ice cream cone. In Proceedings of the SIGDOC Conference 1986, Toronto, June 1986.

H. Lieberman and H. Liu. Adaptive linking between text and photos using common sense reasoning. In Conference on Adaptive Hypermedia and Adaptive Web Systems, Malaga, Spain, 2000.

C. D. Manning and H. Schütze. Foundations of Statistical Natural Language Processing. The MIT Press, Cambridge, Mass., 1999.

R. Mihalcea. Large vocabulary unsupervised word sense disambiguation with graph-based algorithms for sequence data labeling. In Proceedings of the Human Language Technology/Empirical Methods in Natural Language Processing conference, Vancouver, 2005.

R. Mihalcea. Using Wikipedia for automatic word sense disambiguation. In Human Language Technologies 2007: The Conference of the North American Chapter of the Association for Computational Linguistics, Rochester, N.Y., April 2007.

R. Mihalcea and P. Edmonds, editors. Proceedings of SENSEVAL-3, Association for Computational Linguistics Workshop, Barcelona, Spain, 2004.

R. Mihalcea and P. Tarau. TextRank—bringing order into texts. In Proceedings of the Conference on Empirical Methods in Natural Language Processing (EMNLP 2004), Barcelona, Spain, 2004.

G. Miller. Wordnet: A lexical database. Communication of the ACM, 38(11):39-41, 1995.

R. Navigli and M. Lapata. Graph connectivity measures for unsupervised word sense disambiguation. In Proceedings of the International Joint Conference on Artificial Intelligence, Hyderabad, India, 2007.

R. Navigli and P. Velardi. Structural semantic interconnections: a knowledge-based approach to word sense disambiguation. IEEE Transactions on Pattern Analysis and Machine Intelligence (PAMI), 27, 2005.

H. Ng and H. Lee. Integrating multiple knowledge sources to disambiguate word sense: An examplar-based approach. In Proceedings of the 34th Annual Meeting of the Association for Computational Linguistics (ACL 1996), Santa Cruz, 1996.

T. Pedersen. A decision tree of bigrams is an accurate predictor of word sense. In Proceedings of the North American Chapter of the Association for Computational Linguistics (NAACL 2001), pages 79-86, Pittsburgh, June 2001.

S. Pradhan, E. Loper, D. Dligach, and M. Palmer. Semeval-2007 task-17: English lexical sample, srl and all words. In Proceedings of the Fourth International Workshop on Semantic Evaluations (SemEval-2007), Prague, Czech Republic, June 2007.

G. Salton and C. Buckley. Term-weighting approaches in automatic text retrieval. Information Processing & Management, 24(5):513-523, 1988.

M. Strube and S. P. Ponzetto. Wikirelate! Computing semantic relatedness using Wikipedia. In Proceedings of the American Association for Artificial Intelligence, Boston, Mass., 2006.

P. Turney. Learning algorithms for keyword extraction. Information Retrieval, 2(4):303-336, 2000.

S. Brin and L. Page. 1998. The anatomy of a large-scale hypertextual Web search engine. Computer Networks and ISDN Systems, 30(1-7).

A. Csomai and R. Mihalcea. 2006. Creating a testbed for the evaluation of automatically generated back-of-the-book indexes. In Proceedings of the International Conference on Computational Linguistics and Intelligent Text Processing, pages 19-25, Mexico City.

A. Csomai and R. Mihalcea. 2007. Investigations in unsupervised back-of-the-book indexing. In Proceedings of the Florida Artificial Intelligence Research Society, Key West.

D. Feng, J. Kim, E. Shaw, and E. Hovy. 2006. Towards modeling threaded discussions through ontology-based analysis. In Proceedings of National Conference on Artificial Intelligence.

E. Frank, G. W. Paynter, I. H. Witten, C. Gutwin, and C. G. Nevill-Manning 1999. Domain-specific keyword extraction. In Proceedings of the 16th International Joint Conference on Artificial Intelligence.

M. E. Funk and C. A. Reid. 1983. Indexing consistency in MEDLINE. Bulletin of the Medical Library Association, 71(2).

W. Kintsch. 1998. Comprehension: A paradigm for cognition. Cambridge Uniersity Press.

M. Kubat and S. Matwin. 1997. Addressing the curse of imbalanced training sets: one-sided selection. In Proceedings of the 14th International Conference on Machine Learning.

T. K. Landauer, P. Foltz, and D. Laham. 1998. Introduction to latent semantic analysis. Discourse Processes, 25.

C. Manning and H. Schütze. 1999. Foundations of Natural Language Processing. MIT Press. O. Medelyan and I. H. Witten. 2006. Thesaurus based automatic keyword indexing. In Proceedings of the Joint Conference on Digital Libraries.

Although preferred embodiments of the present invention have been described in detail, it will be understood by those skilled in the art that various modifications can be made therein without departing from the spirit and scope of the invention as set forth in the appended claims.

What is claimed is:

1. A method for automatically generating one or more keywords from an electronic document, the method comprising the steps of:

identifying candidate entries for the keywords by extracting all n-grams up to a specified length that do not cross sentence boundaries, reducing a size of a data set consisting of the extracted n-grams by applying one or more filters and balancing a distribution of positive and negative examples whenever the data set is derived from a training data set;

constructing a feature vector for each candidate entry, wherein the feature vector comprises at least one feature selected from the group consisting of one or more discourse comprehension features, one or more part-of-speech pattern features, and one or more encyclopedic annotation features using a computer;

assigning a numeric score to each candidate entry based on the feature vector for that candidate entry using a computer; and selecting a specified number of candidate entries to be retained as the keywords.

2. The method as recited in claim 1, further comprising the step of creating a back-of-the-book index based on the keywords.

3. The method as recited in claim 1, wherein the electronic document is part of a test data set, and further comprising the steps of:

providing the training data set from at least one training document having a manually-constructed collection of keywords;

identifying a training set of candidate entries in the training data set;

constructing a training feature vector for each candidate entry in the training data set, wherein the training feature vector comprises at least one feature selected from the group consisting of a discourse comprehension feature, a part-of-speech pattern feature, and an encyclopedic annotation feature, and wherein the training feature vector further comprises a label indicating presence or absence of the candidate entry in the manually-constructed collection of keywords for that training document;

running a machine learning algorithm on the training data set using the training feature vectors and the training set of candidate entries;

assigning a numeric score to each candidate entry in the test data set by applying the trained machine learning algorithm to the feature vectors for the candidate entries in the test data set;

classifying the candidate entries in the test data set using the numeric score and the trained machine learning algorithm as belonging to the keywords or not; and selecting a specified number of entries to be retained as the keywords for the electronic document.

4. The method as recited in claim 3, wherein the machine learning algorithm is selected from the group consisting of Naïve Bayes, Support Vector Machine, Relevance Vector Machine, decision tree, genetic algorithm, rule induction, k-Nearest Neighbors, Gaussian, Gaussian Mixture Model, artificial neural network, multilayer perceptron, and radial basis function network.

5. The method as recited in claim 3, further comprising the step of creating a back-of-the-book index based on the keywords.

6. The method as recited in claim 1, wherein the step of assigning a numeric score further comprises the steps of:
calculating numeric values for the features; and
applying predetermined weightings to the numeric values to calculate each score.

7. The method as recited in claim 1, wherein the step of assigning a numeric score further comprises the step of running an unsupervised machine learning algorithm to calculate each score.

8. The method as recited in claim 1, wherein the one or more filters include eliminating candidate entries that begin or end with a stopword, or eliminating candidate entries that cross a comma.

9. The method as recited in claim 1, wherein the step of balancing comprises randomly selecting ten percent or fewer of the negative examples.

10. The method as recited in claim 1, wherein the step of identifying candidate entries comprises parsing the electronic document and extracting all possible n-grams that are also present in a controlled vocabulary.

11. The method as recited in claim 10, wherein the controlled vocabulary comprises a collection of at least article titles in an electronic encyclopedia.

12. The method as recited in claim 11, wherein the controlled vocabulary further comprises variations of surface forms of the words in the article titles.

13. The method as recited in claim 1, wherein the feature vector is selected from at least one of information-theoretic features, phraseness, informativeness, term frequency, document frequency, a tf.idf metric, within-document frequency, length of phrase, or a named-entity feature.

14. The method as recited in claim 1, wherein the one or more discourse comprehension features are derived by the steps of:
reading a sentence from the electronic document;
extracting noun phrases from the sentence;
constructing a graph in a working memory with nodes corresponding to the noun phrases;
adding nodes to the graph for all phrases that are in a short-term memory;
connecting all nodes with edges weighted by a semantic relatedness measure derived using a semantic memory;
decreasing the weights on incoming and outgoing edges of nodes coming from the short-term memory by a decay factor proportional to the number of sentences since the phrase was last seen;
ranking the nodes in the graph using a graph centrality measure;
selecting a predetermined number of the highest-ranked nodes and placing their associated phrases in short-term memory;
saving parameters related to a phrase ranking using the centrality measure and a number of iterations that the phrase remains in the short-term memory;
repeating the above steps of reading, extracting, constructing, adding, connecting, decreasing, ranking, selecting and saving until all sentences have been read from the electronic document; and
calculating the one or more discourse comprehension features using the saved parameters.

15. The method as recited in claim 14, wherein the semantic relatedness measure comprises a weighted combination of a variant of latent semantic analysis trained on books and articles and a pointwise mutual information measure.

16. The method as recited in claim 14, wherein the graph centrality measure is derived using the PageRank algorithm.

17. The method as recited in claim 14, wherein the one or more discourse comprehension features further comprise the number of iterations each phrase remains in the short-term memory (CI shortterm), CI shortterm normalized by the frequency of each phrase (CI normalized), or the maximum centrality score that each phrase achieves across the entire document (CI maxscore).

18. The method as recited in claim 14, further comprising the step of creating a back-of-the-book index based on the keywords.

19. The method as recited in claim 1, wherein one of the one or more part-of-speech pattern features is derived by the steps of:
providing a candidate phrase from a list of candidate entries;
labeling each word in the candidate phrase with a tag indicating part-of-speech to form a tag pattern;
using the training data set to calculate a number of distinct phrases C(pattern) having this tag pattern;
using the training data set to calculate a number of phrases C(pattern, positive) having this tag pattern and also having a positive label indicating presence in a manually-constructed collection of keywords associated with the training data set; and
calculating a probability of the tag pattern being positive as P(pattern)=C(pattern, positive)/C(pattern), whereby the probability may be used as the part-of-speech pattern feature.

20. The method as recited in claim 19, further comprising the step of creating a back-of-the-book index based on the keywords.

21. The method as recited in claim 1, wherein at least one of the one or more encyclopedic annotation features is derived by the steps of:
providing an encyclopedia in electronic form having articles with manually-constructed annotations in the form of links to other articles within the encyclopedia;
providing a candidate phrase from a list of candidate entries;
whenever the candidate phrase is used as a title of an article or as anchor text in a link to another article, keeping the phrase in an original form;
whenever the candidate phrase is not used as a title of an article or as anchor text in a link to another article, extending the phrase to include all forms of the same words in the phrase used anywhere in the encyclopedia;
counting the number of articles count(Dkey) in the encyclopedia in which the phrase is used as a keyword and the total number of articles count(DW) in the encyclopedia in which the phrase appeared; and calculating a probability that the phrase will be selected as a keyword in a new article as P(keyword|W)=count (Dkey)/count(DW) whereby the probability may be used as an encyclopedic annotation feature.

22. The method as recited in claim 21, further comprising the step of creating a back-of-the-book index based on the keywords.

23. The method as recited in claim 1, wherein at least one of the one or more encyclopedic annotation features uses a tf.idf metric or a chi-squared independence test.

24. The method as recited in claim 1, wherein the step of selecting further comprises the steps of:
   determining criteria for a size for a keyword collection;
   whenever the criteria specify using a cutoff score, retaining all candidate entries having a score higher than the cutoff score; and
   whenever the criteria specify using a size for the keyword collection that is a predetermined ratio of the size of the electronic document, retaining a fraction of the candidate entries wherein the retained fraction of entries comprises those candidate entries having the highest numeric scores and results in the specified size for the keyword collection.

25. The method as recited in claim 1, wherein the step of selecting further comprises the steps of:
   determining criteria for a size for a keyword collection;
   whenever the criteria specify allowing the machine learning algorithm to decide which candidate entries will be selected for the keyword collection, retaining all candidate entries that are selected by the machine learning algorithm; and
   whenever the criteria specify using the numeric scores to select the entries to be retained, then whenever the criteria specify using a cutoff score, retaining all candidate entries having a score higher than the cutoff score, and whenever the criteria specify using a size for the keyword collection that is a predetermined ratio of the size of the electronic document, retaining a fraction of the candidate entries wherein the retained fraction of entries comprises those candidate entries having the highest numeric scores and results in the specified size for the keyword collection.

26. The method as recited in claim 1, further comprising the steps of:
   extracting sense definitions from a sense inventory; and
   applying at least one disambiguation algorithm to each candidate entry, whereby the most likely sense is determined for each candidate entry.

27. The method as recited in claim 26, wherein the sense inventory comprises a combination of at least article titles in an electronic encyclopedia.

28. The method as recited in claim 27, wherein the sense inventory further comprises variations of surface forms of the words in the article titles.

29. The method as recited in claim 26, wherein the at least one disambiguation algorithm is a Lesk algorithm or a machine learning classifier.

30. The method as recited in claim 26, wherein the step of applying comprises the steps of:
   applying a Lesk algorithm and a machine learning classifier to each candidate entry; and
   retaining the candidate entry whenever the Lesk algorithm and the machine learning classifier are in agreement to retain the candidate entry.

31. The method as recited in claim 26, further comprising the steps of:
   associating each disambiguated candidate entry with a link to an article in an electronic encyclopedia; and
   incorporating the entries and links into the electronic document, whereby the electronic document is annotated with links to relevant articles in the electronic encyclopedia.

32. A computer program embodied on a non-transitory computer readable medium for automatically generating one or more keywords from an electronic document comprising:
   a code segment for identifying candidate entries for the keywords by extracting all n-grams up to a specified length that do not cross sentence boundaries, reducing a size of a data set consisting of the extracted n-grams by applying one or more filters and balancing a distribution of positive and negative examples whenever the data set is derived from a training data set;
   a code segment for constructing a feature vector for each candidate entry, wherein the feature vector comprises at least one feature selected from the group consisting of one or more discourse comprehension features, one or more part-of-speech pattern features, and one or more encyclopedic annotation features;
   a code segment for assigning a numeric score to each candidate entry based on the feature vector for that candidate entry; and
   a code segment for selecting a specified number of entries to be retained as the keywords.

33. The computer program as recited in claim 32, further comprising a code segment for creating a back-of-the-book index based on the keywords.

34. The computer program as recited in claim 32, wherein the electronic document is part of a test data set, and further comprising:
   a code segment for providing the training data set from at least one training document having a manually-constructed collection of keywords;
   a code segment for identifying a training set of candidate entries in the training data set;
   a code segment for constructing a training feature vector for each candidate entry in the training data set, wherein the training feature vector comprises at least one feature selected from the group consisting of a discourse comprehension feature, a part-of-speech pattern feature, and an encyclopedic annotation feature, and wherein the training feature vector further comprises a label indicating presence or absence of the candidate entry in the manually-constructed collection of keywords for that training document;
   a code segment for running a machine learning algorithm on the training data set using the training feature vectors and the training set of candidate entries;
   a code segment for assigning a numeric score to each candidate entry in the test data set by applying the trained machine learning algorithm to the feature vectors for the candidate entries in the test data set;
   a code segment for classifying the candidate entries in the test data set using the numeric score and the trained machine learning algorithm as belonging to the keywords or not; and
   a code segment for selecting a specified number of entries to be retained as the keywords for the electronic document.

35. The computer program as recited in claim 34, wherein the machine learning algorithm is selected from the group consisting of Naïve Bayes, Support Vector Machine, Relevance Vector Machine, decision tree, genetic algorithm, rule induction, k-Nearest Neighbors, Gaussian, Gaussian Mixture Model, artificial neural network, multilayer perceptron, and radial basis function network.

36. The computer program as recited in claim 34, further comprising a code segment for creating a back-of-the-book index based on the keywords.

37. The computer program as recited in claim 32, wherein the code segment for assigning a numeric score further comprises:
 a code segment for calculating numeric values for the features; and
 a code segment for applying predetermined weightings to the numeric values to calculate each score.

38. The computer program as recited in claim 32, wherein the code segment for assigning a numeric score further comprises a code segment for running an unsupervised machine learning algorithm to calculate each score.

39. The computer program as recited in claim 32, wherein the one or more filters include eliminating candidate entries that begin or end with a stopword, or eliminating candidate entries that cross a comma.

40. The computer program as recited in claim 32, wherein the code segment for balancing comprises a code segment for randomly selecting ten percent or fewer of the negative examples.

41. The computer program as recited in claim 32, wherein the code segment for identifying candidate entries comprises a code segment for parsing the electronic document and extracting all possible n-grams that are also present in a controlled vocabulary.

42. The computer program as recited in claim 41, wherein the controlled vocabulary comprises a collection of at least article titles in an electronic encyclopedia.

43. The computer program as recited in claim 42, wherein the controlled vocabulary further comprises variations of surface forms of the words in the article titles.

44. The computer program as recited in claim 32, wherein the feature vector is selected from at least one of information-theoretic features, phraseness, informativeness, term frequency, document frequency, a tf.idf metric, within-document frequency, length of phrase, or a named-entity feature.

45. The computer program as recited in claim 32, wherein the one or more discourse comprehension features are derived by the steps of:
 reading a sentence from the electronic document;
 extracting noun phrases from the sentence;
 constructing a graph in a working memory with nodes corresponding to the noun phrases;
 adding nodes to the graph for all phrases that are in a short-term memory;
 connecting all nodes with edges weighted by a semantic relatedness measure derived using a semantic memory;
 decreasing the weights on incoming and outgoing edges of nodes coming from the short-term memory by a decay factor proportional to the number of sentences since the phrase was last seen;
 ranking the nodes in the graph using a graph centrality measure;
 selecting a predetermined number of the highest-ranked nodes and placing their associated phrases in short-term memory;
 saving parameters related to a phrase ranking using the centrality measure and a number of iterations that the phrase remains in the short-term memory;
 repeating the above steps of reading, extracting, constructing, adding, connecting, decreasing, ranking, selecting and saving until all sentences have been read from the electronic document; and
 calculating the one or more discourse comprehension features using the saved parameters.

46. The computer program as recited in claim 45, wherein the semantic relatedness measure comprises a weighted combination of a variant of latent semantic analysis trained on books and articles and a pointwise mutual information measure.

47. The computer program as recited in claim 45, wherein the graph centrality measure is derived using the PageRank algorithm.

48. The computer program as recited in claim 45, wherein the one or more discourse comprehension features further comprise the number of iterations each phrase remains in the short-term memory (CI shortterm), CI shortterm normalized by the frequency of each phrase (CI normalized), or the maximum centrality score that each phrase achieves across the entire document (CI maxscore).

49. The computer program as recited in claim 45, further comprising a code segment for creating a back-of-the-book index based on the keywords.

50. The computer program as recited in claim 32, wherein one of the one or more part-of-speech pattern features is derived by the steps of:
 providing a candidate phrase from a list of candidate entries;
 labeling each word in the candidate phrase with a tag indicating part-of-speech to form a tag pattern;
 using the training data set to calculate a number of distinct phrases C(pattern) having this tag pattern;
 using the training data set to calculate a number of phrases C(pattern, positive) having this tag pattern and also having a positive label indicating presence in a manually-constructed collection of keywords associated with the training data set; and
 calculating a probability of the tag pattern being positive as P(pattern)=C(pattern, positive)/C(pattern), whereby the probability may be used as the part-of-speech pattern feature.

51. The computer program as recited in claim 50, further comprising a code segment for creating a back-of-the-book index based on the keywords.

52. The computer program as recited in claim 32, wherein at least one of the one or more encyclopedic annotation features is derived by the steps of:
 providing an encyclopedia in electronic form having articles with manually-constructed annotations in the form of links to other articles within the encyclopedia;
 providing a candidate phrase from a list of candidate entries;
 whenever the candidate phrase is used as a title of an article or as anchor text in a link to another article, keeping the phrase in an original form;
 whenever the candidate phrase is not used as a title of an article or as anchor text in a link to another article, extending the phrase to include all forms of the same words in the phrase used anywhere in the encyclopedia;
 counting the number of articles count(Dkey) in the encyclopedia in which the phrase is used as a keyword and the total number of articles count(DW) in the encyclopedia in which the phrase appeared; and
 calculating a probability that the phrase will be selected as a keyword in a new article as P(keyword|W)=count (Dkey)/count(DW) whereby the probability may be used as an encyclopedic annotation feature.

53. The computer program as recited in claim 52, further comprising a code segment for creating a back-of-the-book index based on the keywords.

54. The computer program as recited in claim 32, wherein at least one of the one or more encyclopedic annotation features uses a tf.idf metric or a chi-squared independence test.

55. The computer program as recited in claim 32, wherein the code segment for selecting further comprises:
a code segment for determining criteria for a size for a keyword collection;
a code segment whenever the criteria specify using a cutoff score, retaining all candidate entries having a score higher than the cutoff score; and
a code segment whenever the criteria specify using a size for the keyword collection that is a predetermined ratio of the size of the electronic document, retaining a fraction of the candidate entries wherein the retained fraction of entries comprises those candidate entries having the highest numeric scores and results in the specified size for the keyword collection.

56. The computer program as recited in claim 32, wherein the code segment for selecting further comprises:
a code segment determining criteria for a size for a keyword collection;
a code segment whenever the criteria specify allowing the machine learning algorithm to decide which candidate entries will be selected for the keyword collection, retaining all candidate entries that are selected by the machine learning algorithm; and
a code segment whenever the criteria specify using the numeric scores to select the entries to be retained, then whenever the criteria specify using a cutoff score, retaining all candidate entries having a score higher than the cutoff score, and whenever the criteria specify using a size for the keyword collection that is a predetermined ratio of the size of the electronic document, retaining a fraction of the candidate entries wherein the retained fraction of entries comprises those candidate entries having the highest numeric scores and results in the specified size for the keyword collection.

57. The computer program as recited in claim 32, further comprising:
a code segment extracting sense definitions from a sense inventory; and
a code segment applying at least one disambiguation algorithm to each candidate entry, whereby the most likely sense is determined for each candidate entry.

58. The computer program as recited in claim 57, wherein the sense inventory comprises a combination of at least article titles in an electronic encyclopedia.

59. The computer program as recited in claim 58, wherein the sense inventory further comprises variations of surface forms of the words in the article titles.

60. The computer program as recited in claim 57, wherein the at least one disambiguation algorithm is a Lesk algorithm or a machine learning classifier.

61. The computer program as recited in claim 57, wherein the code segment for applying comprises:
a code segment applying a Lesk algorithm and a machine learning classifier to each candidate entry; and
a code segment retaining the candidate entry whenever the Lesk algorithm and the machine learning classifier are in agreement to retain the candidate entry.

62. The computer program as recited in claim 57, further comprising:
a code segment associating each disambiguated candidate entry with a link to an article in an electronic encyclopedia; and
a code segment incorporating the entries and links into the electronic document, whereby the electronic document is annotated with links to relevant articles in the electronic encyclopedia.

63. An apparatus for automatically generating one or more keywords from an electronic document, the apparatus comprising;
an interface to a document storage repository;
a memory; and
a processor communicably connected to the interface and the memory, wherein the processor (a) identifies candidate entries for the keywords by extracting all n-grams up to a specified length that do not cross sentence boundaries, reducing a size of a data set consisting of the extracted n-grams by applying one or more filters and balancing a distribution of positive and negative examples whenever the data set is derived from a training data set, (b) constructs a feature vector for each candidate entry, wherein the feature vector comprises at least one feature selected from the group consisting of one or more discourse comprehension features, one or more part-of-speech pattern features, and one or more encyclopedic annotation features, (c) assigns a numeric score to each candidate entry based on the feature vector for that candidate entry, and (d) selects a specified number of entries to be retained as the keywords.

64. The apparatus as recited in claim 63, wherein the processor further creates a back-of-the-book index based on the keywords.

65. The apparatus as recited in claim 63, wherein the electronic document is part of a test data set, and the processor further:
provides the training data set from at least one training document having a manually-constructed collection of keywords;
identifies a training set of candidate entries in the training data set;
constructs a training feature vector for each candidate entry in the training data set, wherein the training feature vector comprises at least one feature selected from the group consisting of a discourse comprehension feature, a part-of-speech pattern feature, and an encyclopedic annotation feature, and wherein the training feature vector further comprises a label indicating presence or absence of the candidate entry in the manually-constructed collection of keywords for that training document;
runs a machine learning algorithm on the training data set using the training feature vectors and the training set of candidate entries;
assigns a numeric score to each candidate entry in the test data set by applying the trained machine learning algorithm to the feature vectors for the candidate entries in the test data set;
classifies the candidate entries in the test data set using the numeric score and the trained machine learning algorithm as belonging to the keywords or not; and
selects a specified number of entries to be retained as the keywords for the electronic document.

66. The apparatus as recited in claim 65, wherein the machine learning algorithm is selected from the group consisting of Naïve Bayes, Support Vector Machine, Relevance Vector Machine, decision tree, genetic algorithm, rule induction, k-Nearest Neighbors, Gaussian, Gaussian Mixture Model, artificial neural network, multilayer perceptron, and radial basis function network.

67. The apparatus as recited in claim 65, wherein the processor further creates a back-of-the-book index based on the keywords.

68. The apparatus as recited in claim 63, wherein the processor assigns a numeric score by:
calculating numeric values for the features; and
applying predetermined weightings to the numeric values to calculate each score.

69. The apparatus as recited in claim 63, wherein the processor assigns a numeric score by further running an unsupervised machine learning algorithm to calculate each score.

70. The apparatus as recited in claim 63, wherein the one or more filters include eliminating candidate entries that begin or end with a stopword, or eliminating candidate entries that cross a comma.

71. The apparatus as recited in claim 63, wherein the processor balances randomly selecting ten percent or fewer of the negative examples.

72. The apparatus as recited in claim 63, wherein the processor identifies candidate entries by parsing the electronic document and extracting all possible n-grams that are also present in a controlled vocabulary.

73. The apparatus as recited in claim 72, wherein the controlled vocabulary comprises a collection of at least article titles in an electronic encyclopedia.

74. The apparatus as recited in claim 73, wherein the controlled vocabulary further comprises variations of surface forms of the words in the article titles.

75. The apparatus as recited in claim 63, wherein the feature vector is selected from at least one of information-theoretic features, phraseness, informativeness, term frequency, document frequency, a tf.idf metric, within-document frequency, length of phrase, or a named-entity feature.

76. The apparatus as recited in claim 63, wherein the one or more discourse comprehension features are derived by the steps of:
reading a sentence from the electronic document;
extracting noun phrases from the sentence;
constructing a graph in a working memory with nodes corresponding to the noun phrases;
adding nodes to the graph for all phrases that are in a short-term memory;
connecting all nodes with edges weighted by a semantic relatedness measure derived using a semantic memory;
decreasing the weights on incoming and outgoing edges of nodes coming from the short-term memory by a decay factor proportional to the number of sentences since the phrase was last seen;
ranking the nodes in the graph using a graph centrality measure;
selecting a predetermined number of the highest-ranked nodes and placing their associated phrases in short-term memory;
saving parameters related to a phrase ranking using the centrality measure and a number of iterations that the phrase remains in the short-term memory;
repeating the above steps of reading, extracting, constructing, adding, connecting, decreasing, ranking, selecting and saving until all sentences have been read from the electronic document; and
calculating the one or more discourse comprehension features using the saved parameters.

77. The apparatus as recited in claim 76, wherein the semantic relatedness measure comprises a weighted combination of a variant of latent semantic analysis trained on books and articles and a pointwise mutual information measure.

78. The apparatus as recited in claim 76, wherein the graph centrality measure is derived using the PageRank algorithm.

79. The apparatus as recited in claim 76, wherein the one or more discourse comprehension features further comprise the number of iterations each phrase remains in the short-term memory (CI shortterm), CI shortterm normalized by the frequency of each phrase (CI normalized), or the maximum centrality score that each phrase achieves across the entire document (CI maxscore).

80. The apparatus as recited in claim 76, wherein the processor further creates a back-of-the-book index based on the keywords.

81. The apparatus as recited in claim 63, wherein one of the one or more part-of-speech pattern features is derived by the steps of:
providing a candidate phrase from a list of candidate entries;
labeling each word in the candidate phrase with a tag indicating part-of-speech to form a tag pattern;
using the training data set to calculate a number of distinct phrases C(pattern) having this tag pattern;
using the training data set to calculate a number of phrases C(pattern, positive) having this tag pattern and also having a positive label indicating presence in a manually-constructed collection of keywords associated with the training data set; and
calculating a probability of the tag pattern being positive as P(pattern)=C(pattern, positive)/C(pattern), whereby the probability may be used as the part-of-speech pattern feature.

82. The apparatus as recited in claim 81, wherein the processor further creates a back-of-the-book index based on the keywords.

83. The apparatus as recited in claim 63, wherein at least one of the one or more encyclopedic annotation features is derived by the steps of:
providing an encyclopedia in electronic form having articles with manually-constructed annotations in the form of links to other articles within the encyclopedia;
providing a candidate phrase from a list of candidate entries;
whenever the candidate phrase is used as a title of an article or as anchor text in a link to another article, keeping the phrase in an original form;
whenever the candidate phrase is not used as a title of an article or as anchor text in a link to another article, extending the phrase to include all forms of the same words in the phrase used anywhere in the encyclopedia;
counting the number of articles count(Dkey) in the encyclopedia in which the phrase is used as a keyword and the total number of articles count(DW) in the encyclopedia in which the phrase appeared; and
calculating a probability that the phrase will be selected as a keyword in a new article as P(keyword|W)=count(Dkey)/count(DW) whereby the probability may be used as an encyclopedic annotation feature.

84. The apparatus as recited in claim 83, wherein the processor further creates a back-of-the-book index based on the keywords.

85. The apparatus as recited in claim 63, wherein at least one of the one or more encyclopedic annotation features uses a tf.idf metric or a chi-squared independence test.

86. The apparatus as recited in claim 63, wherein the processor selects by further:

determining criteria for a size for a keyword collection;

whenever the criteria specify using a cutoff score, retaining all candidate entries having a score higher than the cutoff score; and whenever the criteria specify using a size for the keyword collection that is a predetermined ratio of the size of the electronic document, retaining a fraction of the candidate entries wherein the retained fraction of entries comprises those candidate entries having the highest numeric scores and results in the specified size for the keyword collection.

87. The apparatus as recited in claim 63, wherein the processor selects by further:

determining criteria for a size for a keyword collection;

whenever the criteria specify allowing the machine learning algorithm to decide which candidate entries will be selected for the keyword collection, retaining all candidate entries that are selected by the machine learning algorithm; and whenever the criteria specify using the numeric scores to select the entries to be retained, then whenever the criteria specify using a cutoff score, retaining all candidate entries having a score higher than the cutoff score, and whenever the criteria specify using a size for the keyword collection that is a predetermined ratio of the size of the electronic document, retaining a fraction of the candidate entries wherein the retained fraction of entries comprises those candidate entries having the highest numeric scores and results in the specified size for the keyword collection.

88. The apparatus as recited in claim 63, wherein the processor further:

extracts sense definitions from a sense inventory; and applies at least one disambiguation algorithm to each candidate entry, whereby the most likely sense is determined for each candidate entry.

89. The apparatus as recited in claim 88, wherein the sense inventory comprises a combination of at least article titles in an electronic encyclopedia.

90. The apparatus as recited in claim 89, wherein the sense inventory further comprises variations of surface forms of the words in the article titles.

91. The apparatus as recited in claim 88, wherein the at least one disambiguation algorithm is a Lesk algorithm or a machine learning classifier.

92. The apparatus as recited in claim 88, wherein the processor applies by:

applying a Lesk algorithm and a machine learning classifier to each candidate entry; and retaining the candidate entry whenever the Lesk algorithm and the machine learning classifier are in agreement to retain the candidate entry.

93. The apparatus as recited in claim 88, wherein the processor further:

associates each disambiguated candidate entry with a link to an article in an electronic encyclopedia; and incorporates the entries and links into the electronic document, whereby the electronic document is annotated with links to relevant articles in the electronic encyclopedia.

94. A system for automatically generating one or more keywords from an electronic document, the system comprising:

a network;

one or more client computers communicably connected to the network;

one or more server computers communicably connected to the network;

one or more document storage repositories communicably connected to the network, to one or more of the client computers, or to one or more of the server computers; and a processor within at least one of the client computers or server computers, wherein the processor (a) identifies candidate entries for the keywords by extracting all n-grams up to a specified length that do not cross sentence boundaries, reducing a size of a data set consisting of the extracted n-grams by applying one or more filters and balancing a distribution of positive and negative examples whenever the data set is derived from a training data set, (b) constructs a feature vector for each candidate entry, wherein the feature vector comprises at least one feature selected from the group consisting of one or more discourse comprehension features, one or more part-of-speech pattern features, and one or more encyclopedic annotation features, (c) assigns a numeric score to each candidate entry based on the feature vector for that candidate entry, and (d) selects a specified number of entries to be retained as the keywords.

95. The system as recited in claim 94, wherein the processor further creates a back-of-the-book index based on the keywords.

96. The system as recited in claim 94, wherein the electronic document is part of a test data set, and the processor further:

provides the training data set from at least one training document having a manually-constructed collection of keywords;

identifies a training set of candidate entries in the training data set;

constructs a training feature vector for each candidate entry in the training data set, wherein the training feature vector comprises at least one feature selected from the group consisting of a discourse comprehension feature, a part-of-speech pattern feature, and an encyclopedic annotation feature, and wherein the training feature vector further comprises a label indicating presence or absence of the candidate entry in the manually-constructed collection of keywords for that training document;

runs a machine learning algorithm on the training data set using the training feature vectors and the training set of candidate entries;

assigns a numeric score to each candidate entry in the test data set by applying the trained machine learning algorithm to the feature vectors for the candidate entries in the test data set;

classifies the candidate entries in the test data set using the numeric score and the trained machine learning algorithm as belonging to the keywords or not; and selects a specified number of entries to be retained as the keywords for the electronic document.

97. The system as recited in claim 96, wherein the machine learning algorithm is selected from the group consisting of Naïve Bayes, Support Vector Machine, Relevance Vector Machine, decision tree, genetic algorithm, rule induction, k-Nearest Neighbors, Gaussian, Gaussian Mixture Model, artificial neural network, multilayer perceptron, and radial basis function network.

98. The system as recited in claim 96, wherein the processor further creates a back-of-the-book index based on the keywords.

99. The system as recited in claim 94, wherein the processor assigns a numeric score by:
- calculating numeric values for the features; and
- applying predetermined weightings to the numeric values to calculate each score.

100. The system as recited in claim 94, wherein the processor assigns a numeric score by further running an unsupervised machine learning algorithm to calculate each score.

101. The system as recited in claim 94, wherein the one or more filters include eliminating candidate entries that begin or end with a stopword, or eliminating candidate entries that cross a comma.

102. The system as recited in claim 94, wherein the processor balances randomly selecting ten percent or fewer of the negative examples.

103. The system as recited in claim 94, wherein the processor identifies candidate entries by parsing the electronic document and extracting all possible n-grams that are also present in a controlled vocabulary.

104. The system as recited in claim 103, wherein the controlled vocabulary comprises a collection of at least article titles in an electronic encyclopedia.

105. The system as recited in claim 104, wherein the controlled vocabulary further comprises variations of surface forms of the words in the article titles.

106. The system as recited in claim 94, wherein the feature vector is selected from at least one of information-theoretic features, phraseness, informativeness, term frequency, document frequency, a tf.idf metric, within-document frequency, length of phrase, or a named-entity feature.

107. The system as recited in claim 94, wherein the one or more discourse comprehension features are derived by the steps of:
- reading a sentence from the electronic document;
- extracting noun phrases from the sentence;
- constructing a graph in a working memory with nodes corresponding to the noun phrases;
- adding nodes to the graph for all phrases that are in a short-term memory;
- connecting all nodes with edges weighted by a semantic relatedness measure derived using a semantic memory;
- decreasing the weights on incoming and outgoing edges of nodes coming from the short-term memory by a decay factor proportional to the number of sentences since the phrase was last seen;
- ranking the nodes in the graph using a graph centrality measure;
- selecting a predetermined number of the highest-ranked nodes and placing their associated phrases in short-term memory;
- saving parameters related to a phrase ranking using the centrality measure and a number of iterations that the phrase remains in the short-term memory;
- repeating the above steps of reading, extracting, constructing, adding, connecting, decreasing, ranking, selecting and saving until all sentences have been read from the electronic document; and
- calculating the one or more discourse comprehension features using the saved parameters.

108. The system as recited in claim 107, wherein the semantic relatedness measure comprises a weighted combination of a variant of latent semantic analysis trained on books and articles and a pointwise mutual information measure.

109. The system as recited in claim 107, wherein the graph centrality measure is derived using the PageRank algorithm.

110. The system as recited in claim 107, wherein the one or more discourse comprehension features further comprise the number of iterations each phrase remains in the short-term memory (CI shortterm), CI shortterm normalized by the frequency of each phrase (CI normalized), or the maximum centrality score that each phrase achieves across the entire document (CI maxscore).

111. The system as recited in claim 107, wherein the processor further creates a back-of-the-book index based on the keywords.

112. The system as recited in claim 94, wherein one of the one or more part-of-speech pattern features is derived by the steps of:
- providing a candidate phrase from a list of candidate entries;
- labeling each word in the candidate phrase with a tag indicating part-of-speech to form a tag pattern;
- using the training data set to calculate a number of distinct phrases C(pattern) having this tag pattern;
- using the training data set to calculate a number of phrases C(pattern, positive) having this tag pattern and also having a positive label indicating presence in a manually-constructed collection of keywords associated with the training data set; and
- calculating a probability of the tag pattern being positive as P(pattern)=C(pattern, positive)/C(pattern), whereby the probability may be used as the part-of-speech pattern feature.

113. The system as recited in claim 112, wherein the processor further creates a back-of-the-book index based on the keywords.

114. The system as recited in claim 94, wherein at least one of the one or more encyclopedic annotation features is derived by the steps of:
- providing an encyclopedia in electronic form having articles with manually-constructed annotations in the form of links to other articles within the encyclopedia;
- providing a candidate phrase from a list of candidate entries;
- whenever the candidate phrase is used as a title of an article or as anchor text in a link to another article, keeping the phrase in an original form;
- whenever the candidate phrase is not used as a title of an article or as anchor text in a link to another article, extending the phrase to include all forms of the same words in the phrase used anywhere in the encyclopedia;
- counting the number of articles count(Dkey) in the encyclopedia in which the phrase is used as a keyword and the total number of articles count(DW) in the encyclopedia in which the phrase appeared; and
- calculating a probability that the phrase will be selected as a keyword in a new article as P(keyword|W)=count(Dkey)/count(DW) whereby the probability may be used as an encyclopedic annotation feature.

115. The system as recited in claim 114, wherein the processor further creates a back-of-the-book index based on the keywords.

116. The system as recited in claim 94, wherein at least one of the one or more encyclopedic annotation features uses a tf.idf metric or a chi-squared independence test.

117. The system as recited in claim 94, wherein the processor selects by further:
  determining criteria for a size for a keyword collection;
  whenever the criteria specify using a cutoff score, retaining all candidate entries having a score higher than the cutoff score; and
  whenever the criteria specify using a size for the keyword collection that is a predetermined ratio of the size of the electronic document, retaining a fraction of the candidate entries wherein the retained fraction of entries comprises those candidate entries having the highest numeric scores and results in the specified size for the keyword collection.

118. The system as recited in claim 94, wherein the processor selects by further:
  determining criteria for a size for a keyword collection;
  whenever the criteria specify allowing the machine learning algorithm to decide which candidate entries will be selected for the keyword collection, retaining all candidate entries that are selected by the machine learning algorithm; and
  whenever the criteria specify using the numeric scores to select the entries to be retained, then whenever the criteria specify using a cutoff score, retaining all candidate entries having a score higher than the cutoff score, and whenever the criteria specify using a size for the keyword collection that is a predetermined ratio of the size of the electronic document, retaining a fraction of the candidate entries wherein the retained fraction of entries comprises those candidate entries having the highest numeric scores and results in the specified size for the keyword collection.

119. The system as recited in claim 94, wherein the processor further:
  extracts sense definitions from a sense inventory; and
  applies at least one disambiguation algorithm to each candidate entry, whereby the most likely sense is determined for each candidate entry.

120. The system as recited in claim 119, wherein the sense inventory comprises a combination of at least article titles in an electronic encyclopedia.

121. The system as recited in claim 120, wherein the sense inventory further comprises variations of surface forms of the words in the article titles.

122. The system as recited in claim 119, wherein the at least one disambiguation algorithm is a Lesk algorithm or a machine learning classifier.

123. The system as recited in claim 119, wherein the processor applies by:
  applying a Lesk algorithm and a machine learning classifier to each candidate entry; and
  retaining the candidate entry whenever the Lesk algorithm and the machine learning classifier are in agreement to retain the candidate entry.

124. The system as recited in claim 119, wherein the processor further:
  associates each disambiguated candidate entry with a link to an article in an electronic encyclopedia; and
  incorporates the entries and links into the electronic document, whereby the electronic document is annotated with links to relevant articles in the electronic encyclopedia.

\* \* \* \* \*

UNITED STATES PATENT AND TRADEMARK OFFICE
CERTIFICATE OF CORRECTION

PATENT NO. : 8,346,534 B2  Page 1 of 1
APPLICATION NO. : 12/614387
DATED : January 1, 2013
INVENTOR(S) : Csomai et al.

It is certified that error appears in the above-identified patent and that said Letters Patent is hereby corrected as shown below:

On the title page item [73], Replace "University of North Texas System" with --University of North Texas--

Signed and Sealed this
Twenty-ninth Day of December, 2015

Michelle K. Lee
*Director of the United States Patent and Trademark Office*